(12) United States Patent
Richardson

(10) Patent No.: US 8,763,661 B2
(45) Date of Patent: Jul. 1, 2014

(54) TIRE INFLATION SYSTEM

(75) Inventor: Brandon Richardson, Palo Alto, CA (US)

(73) Assignee: Aperia Technologies, Inc., Burlingame, CA (US)

(*) Notice: Subject to any disclaimer, the term of this patent is extended or adjusted under 35 U.S.C. 154(b) by 367 days.

(21) Appl. No.: 13/187,949

(22) Filed: Jul. 21, 2011

(65) Prior Publication Data

US 2012/0186714 A1 Jul. 26, 2012

Related U.S. Application Data

(60) Provisional application No. 61/400,033, filed on Jul. 21, 2010, provisional application No. 61/433,866, filed on Jan. 18, 2011, provisional application No. 61/484,403, filed on May 10, 2011, provisional application No. 61/433,862, filed on Jan. 18, 2011.

(51) Int. Cl.
B60C 23/12 (2006.01)

(52) U.S. Cl.
USPC .......................................... 152/419; 152/415

(58) Field of Classification Search
USPC .......... 152/415, 417, 418, 419, 421; 73/146.2
See application file for complete search history.

(56) References Cited

U.S. PATENT DOCUMENTS

| | | |
|---|---|---|
| 2,211,935 A | 8/1940 | Parker |
| 2,415,618 A * | 2/1947 | West ............................. 417/498 |
| 3,012,820 A | 12/1961 | King |
| 3,047,339 A | 7/1962 | Hamer |
| 3,152,553 A | 10/1964 | Sverker |
| 3,532,449 A | 10/1970 | Garton |
| 3,981,633 A | 9/1976 | Wall |
| 4,030,300 A | 6/1977 | Thompson |
| 4,095,923 A | 6/1978 | Cullis |
| 4,121,472 A | 10/1978 | Vural et al. |
| 4,157,530 A | 6/1979 | Merz |
| 4,256,971 A | 3/1981 | Griffith |
| 4,291,235 A | 9/1981 | Bergey, Jr. et al. |
| 4,370,894 A | 2/1983 | Sturesson |
| 4,536,668 A | 8/1985 | Boyer |
| 4,606,710 A | 8/1986 | Maguire |
| 4,637,152 A | 1/1987 | Roy |
| 4,807,487 A | 2/1989 | Seidl |
| 4,819,593 A | 4/1989 | Bruener et al. |
| 4,922,984 A | 5/1990 | Dosjoub et al. |
| 5,018,797 A | 5/1991 | Takata |

(Continued)

FOREIGN PATENT DOCUMENTS

| | | |
|---|---|---|
| WO | 2009034321 A | 3/2009 |
| WO | 2012012617 A | 1/2012 |

Primary Examiner — Kip T Kotter
(74) Attorney, Agent, or Firm — Jeffrey Schox; Diana Lin

(57) ABSTRACT

A tire inflation system that couples to the wheel of a vehicle, the tire inflation system including a pumping ring that rotates with the wheel; a positioning system rotatably coupled to the wheel, the positioning system including a positioning mechanism and an eccentric mass; a planetary roller disposed in non-slip contact with the pumping ring and the positioning system; and a flexible diaphragm that defines a pump cavity, wherein relative motion between the pumping ring and positioning system is translated by the planetary roller into an occluding force that deforms the diaphragm to occlude the pump cavity. Relative motion between the pumping ring and the positioning system is achieved by coupling the eccentric mass to the positioning mechanism to offset the center of mass of the positioning system from the center of rotation of the positioning system.

25 Claims, 17 Drawing Sheets

(56) References Cited

U.S. PATENT DOCUMENTS

| | | |
|---|---|---|
| 5,052,456 A | 10/1991 | Dosjoub |
| 5,173,038 A | 12/1992 | Hopfensperger et al. |
| 5,201,968 A | 4/1993 | Renier |
| 5,293,919 A | 3/1994 | Olney et al. |
| 5,325,902 A | 7/1994 | Loewe et al. |
| 5,342,177 A | 8/1994 | Cheng |
| 5,375,984 A | 12/1994 | Wehling |
| 5,388,470 A | 2/1995 | Marsh, Jr. |
| 5,409,049 A | 4/1995 | Renier |
| 5,413,159 A | 5/1995 | Olney et al. |
| 5,468,129 A | 11/1995 | Sunden et al. |
| 5,482,447 A | 1/1996 | Sunden et al. |
| 5,495,879 A | 3/1996 | Cabestrero |
| 5,591,281 A | 1/1997 | Loewe |
| 5,646,727 A | 7/1997 | Hammer et al. |
| 5,667,606 A * | 9/1997 | Renier ............ 152/421 |
| 5,707,215 A | 1/1998 | Olney et al. |
| 5,894,757 A | 4/1999 | Sully |
| 5,941,692 A | 8/1999 | Olney et al. |
| 5,941,696 A | 8/1999 | Fenstermacher et al. |
| 6,267,450 B1 | 7/2001 | Gamble |
| 6,463,798 B2 | 10/2002 | Niekerk et al. |
| 6,474,832 B2 | 11/2002 | Murray |
| 6,494,693 B1 | 12/2002 | Sunden |
| 6,742,386 B1 | 6/2004 | Larson |
| 6,744,356 B2 * | 6/2004 | Hamilton et al. ............ 340/444 |
| 6,814,547 B2 | 11/2004 | Childers et al. |
| 6,871,683 B2 | 3/2005 | Cobb |
| 6,994,136 B2 | 2/2006 | Stanczak |
| 7,117,731 B2 | 10/2006 | Hrabal |
| 7,222,487 B1 | 5/2007 | Hinkley |
| 7,225,845 B2 | 6/2007 | Ellmann |
| 7,237,590 B2 | 7/2007 | Loewe |
| 7,357,164 B2 | 4/2008 | Loewe |
| 7,498,683 B2 | 3/2009 | Landwehr |
| 7,581,576 B2 | 9/2009 | Nakano |
| 7,607,465 B2 | 10/2009 | Loewe |
| 7,614,474 B2 | 11/2009 | Yang |
| 7,625,189 B2 | 12/2009 | Cheng |
| 7,704,057 B2 | 4/2010 | Malbec et al. |
| 7,748,422 B2 | 7/2010 | Bol |
| 7,784,513 B2 | 8/2010 | Loewe |
| 7,828,095 B2 | 11/2010 | Murata et al. |
| 7,828,101 B2 | 11/2010 | Radtke et al. |
| 7,856,871 B2 | 12/2010 | Mancosu et al. |
| 7,931,061 B2 | 4/2011 | Gonska et al. |
| 7,975,789 B2 | 7/2011 | Murata |
| 8,042,586 B2 | 10/2011 | Losey et al. |
| 8,083,503 B2 | 12/2011 | Voltenburg, Jr. et al. |
| 8,113,254 B2 | 2/2012 | Benedict |
| 2007/0151648 A1 | 7/2007 | Loewe |
| 2010/0243121 A1 | 9/2010 | Eigenbrode |

* cited by examiner

FIGURE 8A
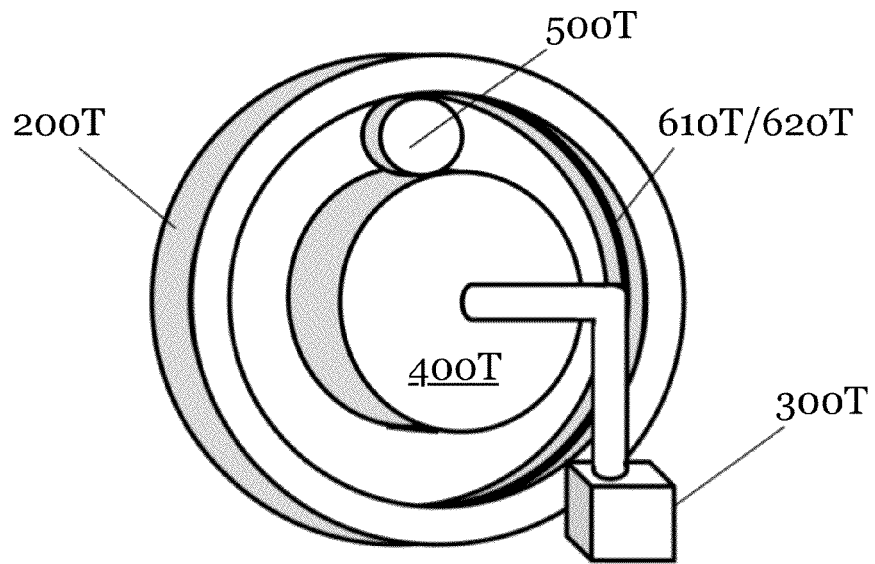
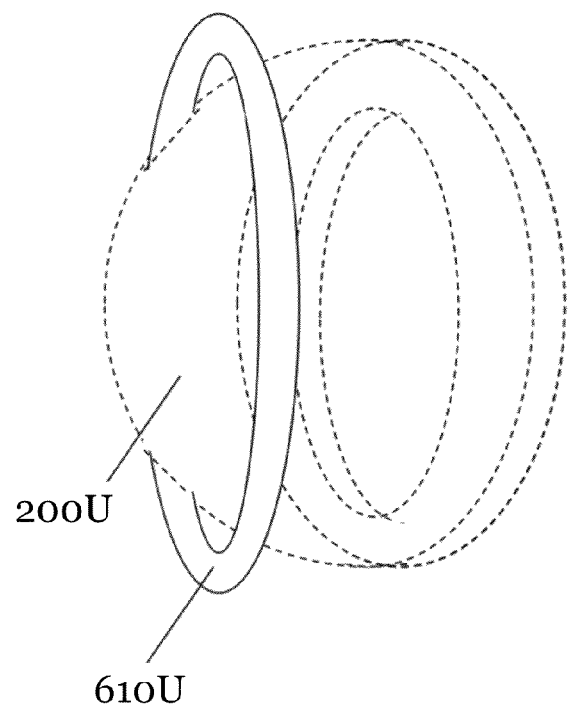
FIGURE 8B

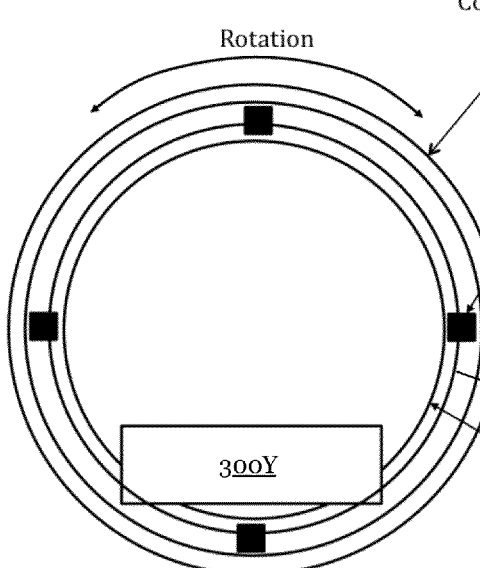
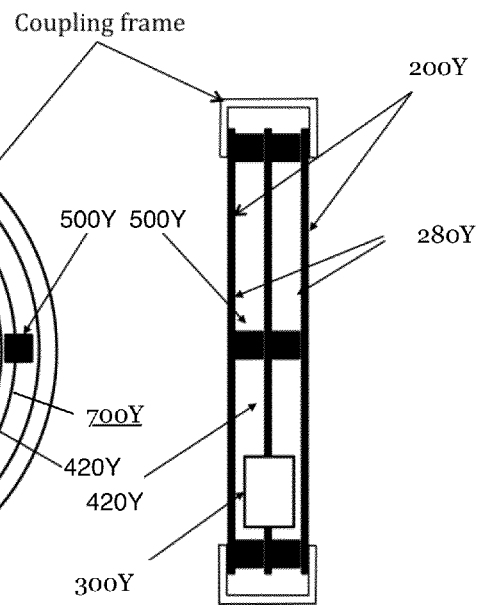
FIGURE 10B
FIGURE 10C
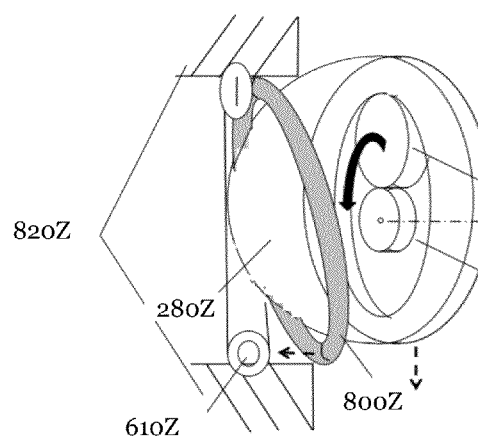
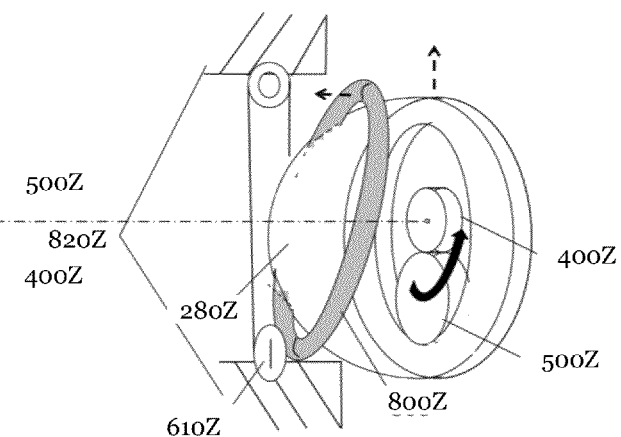
FIGURE 11A
FIGURE 11B

TIRE INFLATION SYSTEM

CROSS-REFERENCE TO RELATED APPLICATIONS

This application is related to U.S. Provisional Application No. 61/400,033 filed on 21 Jul. 2010, U.S. Provisional Application No. 61/433,866 filed on 18 Jan. 2011, U.S. Provisional Application No. 61/484,403 filed on 10 May 2011, and U.S. Provisional Application No. 61/433,862 filed on 18 Jan. 2011, which are all incorporated in their entirety by this reference.

TECHNICAL FIELD

This invention relates generally to the automotive field, and more specifically to a new and useful tire inflation system in the automotive field.

BACKGROUND

Tires that are not optimally pressurized contribute to low fuel efficiency. These effects are particularly felt in the trucking industry, where long distances and large loads amplify the effects of an underinflated tire. However, it is often inconvenient and inefficient for truck drivers to constantly stop, check, and inflate the vehicle tires to the optimal pressure, leading to the persistence of less-than-optimal fuel efficiency in most trucks. This problem has led to several auto-inflating tire systems. Conventional auto-inflating tire systems are either central or distributed, but each suffers from its own set of drawbacks. Central inflation systems are complex and expensive, and require significant work for aftermarket installation (drilling through axles, tapping existing air lines, etc). Distributed systems are mounted at each wheel and can be less expensive, but the potential for reduced cost is typically at the expense of the continuous replacement of the device (which fails due to the harsh wheel environment). Thus, there is a need in the automotive field to create a new and useful tire inflation pump.

BRIEF DESCRIPTION OF THE FIGS

FIGS. 1A, and 1B are side views of a first variation of the tire inflation system 100A including a rotating ring 200A, eccentric mass 300A, positioning mechanism 400A, roller element 500A, diaphragm 600A, and pump cavity 610A and second variation of the tire inflation system 100B including rotating ring 200B eccentric mass 100B, positioning mechanism 400B, roller element 500B, diaphragm 600B, and pump cavity 610B, respectively.

FIG. 2 is a side view of a variation of the tire inflation system in operation, including rotating ring 200C, positioning mechanism 400C, roller element 500C, diaphragm 600C, actuator strip actuator strip 660C, inlet valve 612a, and outlet valve 612b.

FIGS. 3A, 3B, and 3C are perspective views of a first variation of the rotating ring 200D including inner radial surface 220D, outer radial surface 240D, and bearing face 280D, a second variation of the rotating ring 200E including inner radial surface 220E, outer radial surface 240E, and bearing face 280E, and a third variation of the rotating ring 200F including inner radial surface 220F and bearing face 280F.

FIGS. 4A, 4B, and 4C are perspective views of a first variation of the positioning system positioning system 320G, including eccentric mass 300G and positioning mechanism 400G, second variation of the positioning system positioning system 320H, including eccentric mass 300H and positioning mechanism 400H, and third variation of the positioning system positioning system 320I including eccentric mass 300I, lever arm 322I, and positioning mechanism 400I, respectively.

FIGS. 5A and 5B are perspective views of a first variation of the positioning system positioning mechanism 400J placement, the system including eccentric mass 300J, positioning system 320J, and rotating ring 200J, and a second variation of the positioning system 400K placement, the system 100K including inner radial surface 220K, bearing face 280K, eccentric mass 300K, positioning system 320K, positioning mechanism 400K, diaphragm 600K, outer radial surface 240K, roller element 500K, spacer rollers 520K, cutout 720K, retainer ring 700K, and housing 900K, respectively.

FIGS. 6A and 6B are perspective views of a first variation of the roller element 500L, the system including rotating ring 200L, eccentric mass 300L, and positioning mechanism 400L, and a second variation of the roller element 500M, the system including rotating ring 200M, eccentric mass 300M, and positioning mechanism 400M.

FIGS. 7A, 7B, 7C, 7D, and 7E are a perspective view of a first variation of the system including a diaphragm 600N and diaphragm restraint 640N, a perspective view of a second variation of the system including a diaphragm 600P, roller element 500P, pump cavity 610P, and diaphragm restraint 640P, a cross sectional view of a third variation of the system including a diaphragm 600Q, pump cavity 610Q, groove 620Q, and actuator strip 660Q, a cross sectional view of a first version of the diaphragm restraint diaphragm restraint 640R including groove 620R, and a cross sectional view of a second version of the diaphragm restraint diaphragm restraint 640S including diaphragm 600S and pump cavity 610S, respectively.

FIGS. 8A and 8B are perspective views of a first variation of pump cavity 610T positioning within a system including rotating ring 200T, eccentric mass 300T, positioning mechanism 400T, roller element 500T, and groove 620T, and a second variation of the pump cavity 610U positioning within a system including rotating ring 200U.

FIGS. 9A, 9B, 9C, and 9D are schematic representations of a first version of the actuator strip actuator strip 660V including bearing surface 662V and occluding component 664V, the deflected actuator strip 660V, the actuator strip 660V with a surface strip 680, and a second version of the actuator strip 660W including bearing surface 662W and occluding component 664W, respectively.

FIGS. 10A, 10B, and 10C are an exploded view of a first version of the tire inflation system 100X with a rotating ring 200X, inner radial surface 220X, outer radial surface 240X, eccentric mass 300X, positioning system 320X, positioning mechanism 400X, roller element 500X, groove 620X, a retainer ring 700X, cutout 720X, and housing 900X, a cross sectional view of a second version of the tire inflation system with rotating ring 200Y, bearing face 280Y, eccentric mass 300Y, gravity ring 420Y, roller element 500Y, and a retainer ring 700Y, and a side view of the second version of the tire inflation system with a retainer ring 700Y, respectively.

FIGS. 11A and 11B are schematic representations of a variation of the system including the occluding ring 800 in a first and a second position, respectively, the system further including bearing face 280Z, positioning mechanism 400Z, roller element 500Z, pump cavity 610Z, and occluding ring 800Z.

Figure 13A:
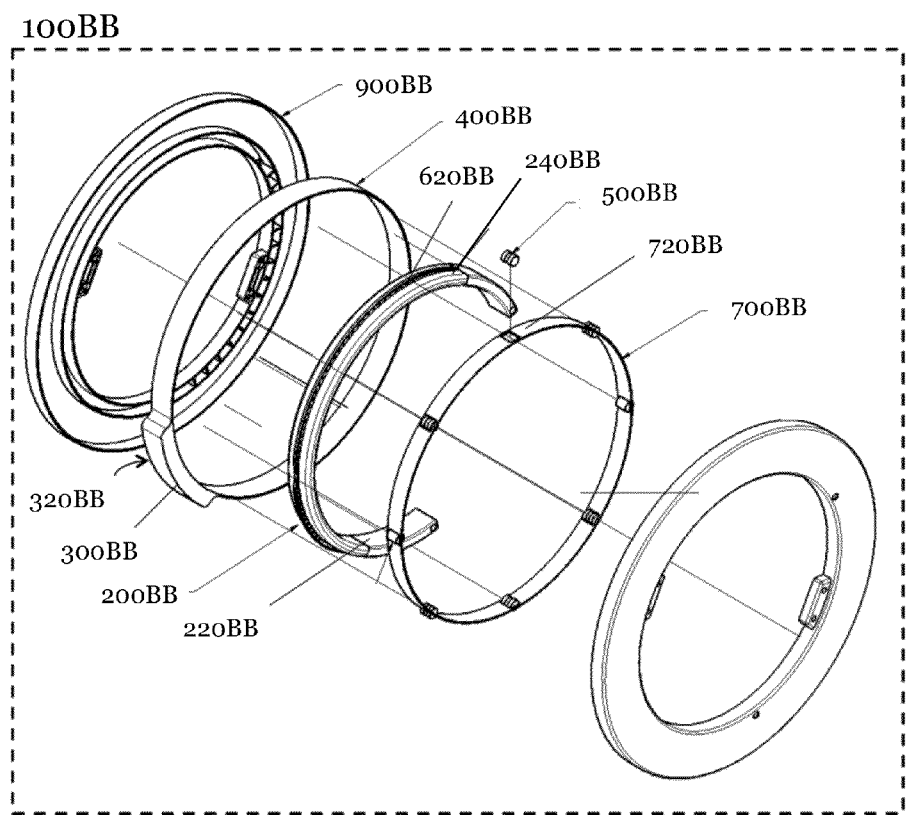
Figure 13B:
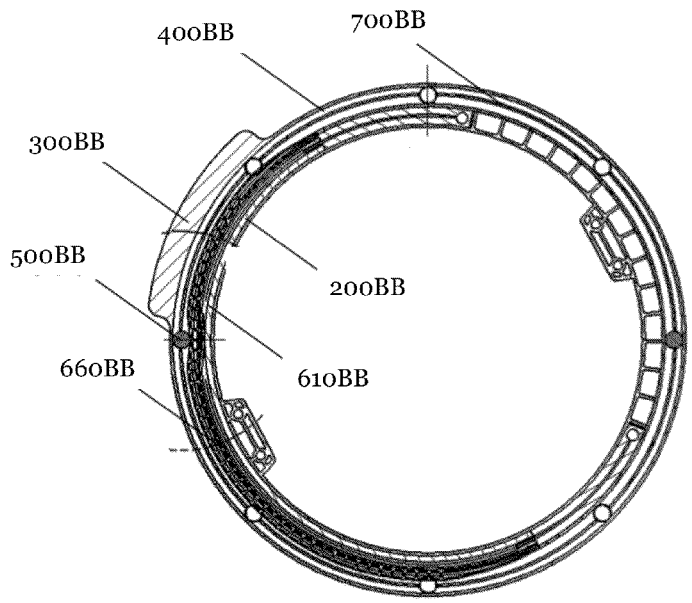

FIGS. 13A and 13B are an exploded view and a cross sectional view of a second embodiment of the tire inflation system 100BB, respectively, the system 100BB including rotating ring 200BB, inner radial surface 220BB, eccentric mass 300BB, positioning system 320BB, outer radial surface 240BB, positioning mechanism 400BB, roller element 500BB, pump cavity 610BB, groove 620BB, actuator strip 660BB cutout 720BB, retainer ring 700BB, and housing 900BB.

Figures 14A, 14B:
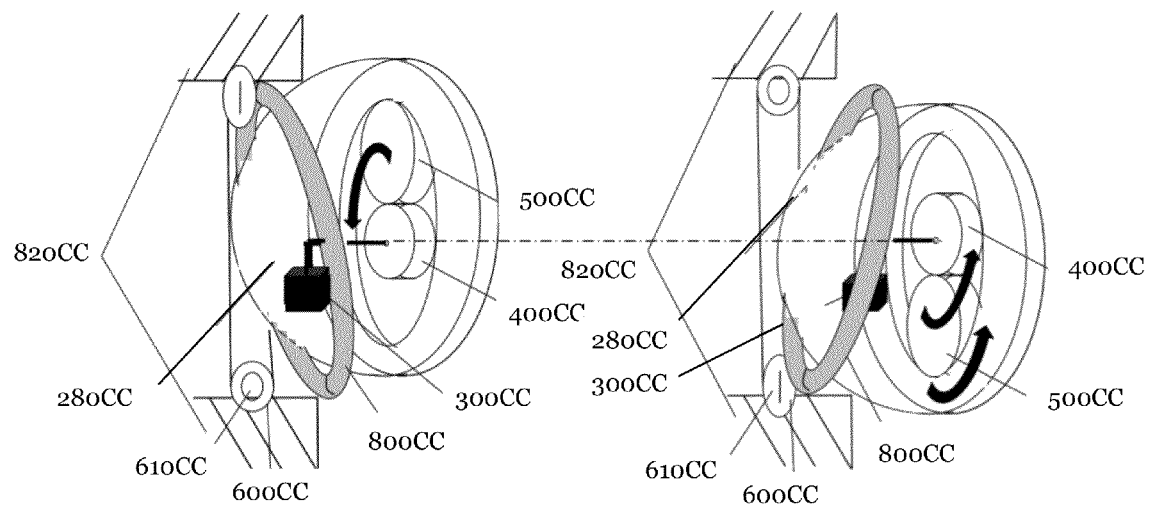

FIGS. 14A and 14B are schematic representations of a third embodiment of the tire inflation system in a first and a second position, respectively, the tire inflation system including bearing face 280CC, eccentric mass 300CC, positioning mechanism 400CC, roller element 500CC, diaphragm 600CC, pump cavity 610CC, occluding ring 800CC, occluding ring restraint 820CC.

Figure 15A:
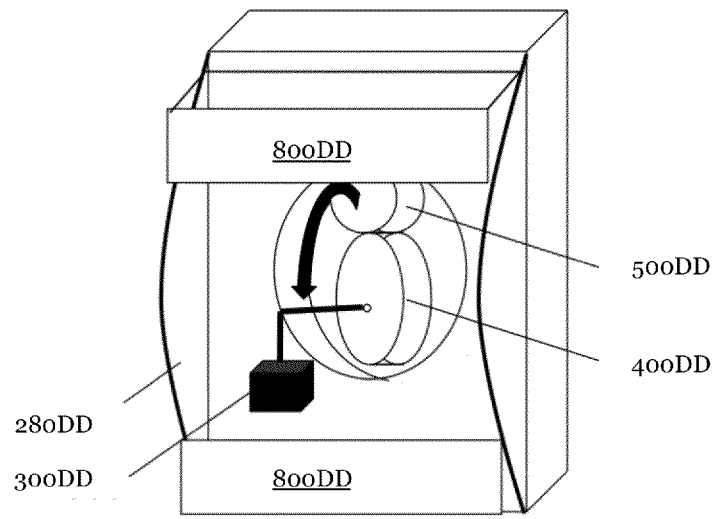
Figure 15B:
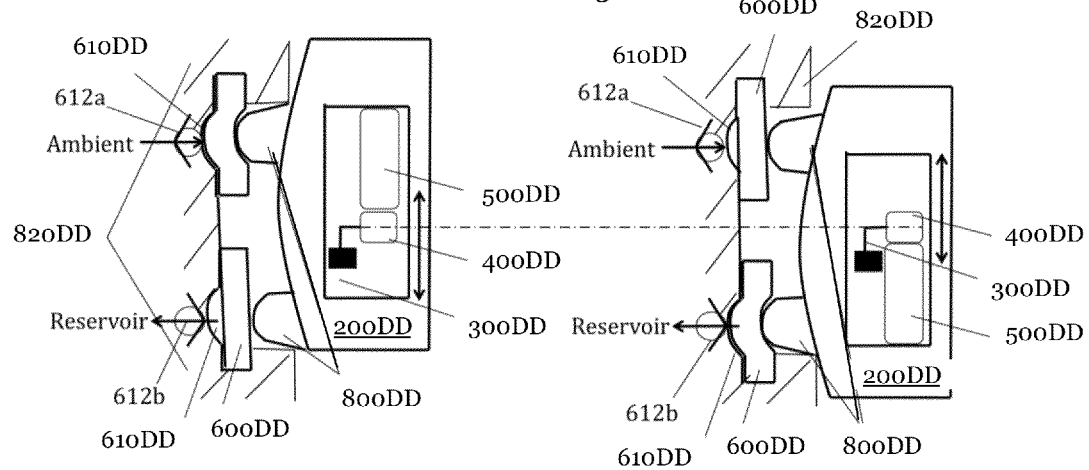
Figure 15C:
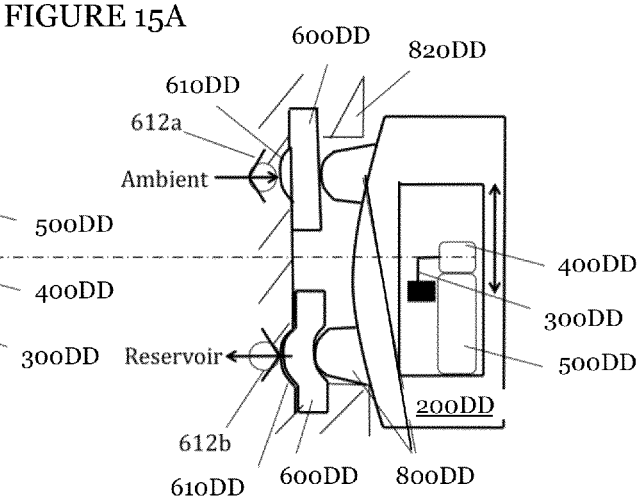

FIGS. 15A, 15B and 15C are a perspective view of a fourth embodiment of the tire inflation system, a schematic representation of the fourth embodiment in a first position, and a schematic representation of the fourth embodiment in a second position, respectively, the system including rotating ring 200DD, bearing face 280DD, eccentric mass 300DD, positioning mechanism 400DD, roller element 500DD, diaphragm 600DD, pump cavity 610DD, inlet valve 612a, outlet valve 612b, occluding ring 800DD, and occluding ring restraint 820DD.

Figure 16:
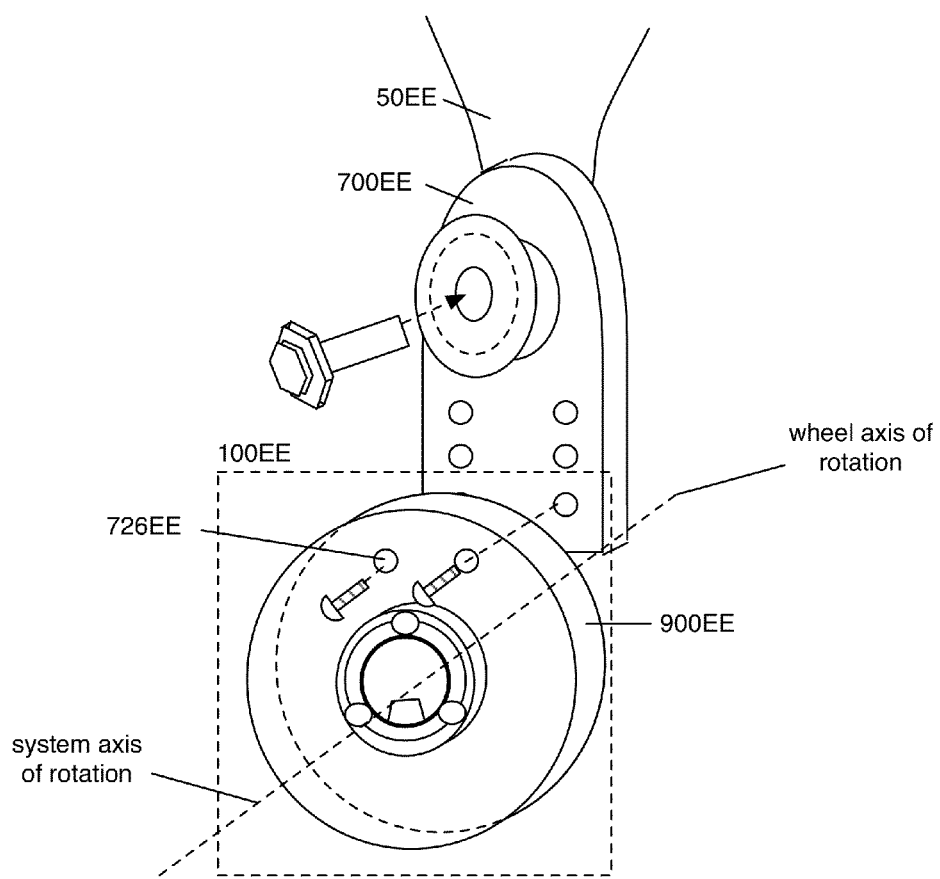

FIG. 16 is a schematic representation of mounting the system 100EE to the wheel 50EE using a variation of the mounting mechanism 727EE, wherein the system 100EE is mounted to the mounting mechanism 727EE through mounting points 726EE in the housing 900EE.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Tire Inflation System

Figure 1A:
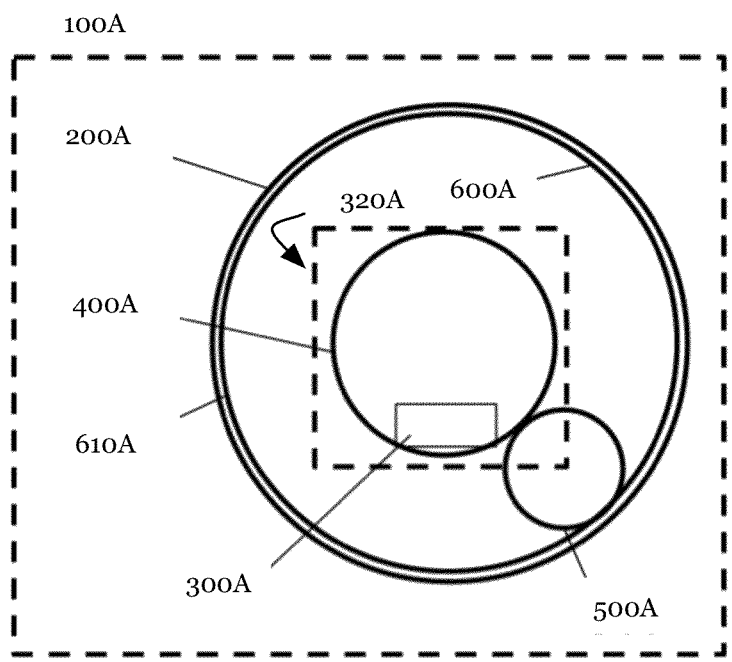
Figure 1B:
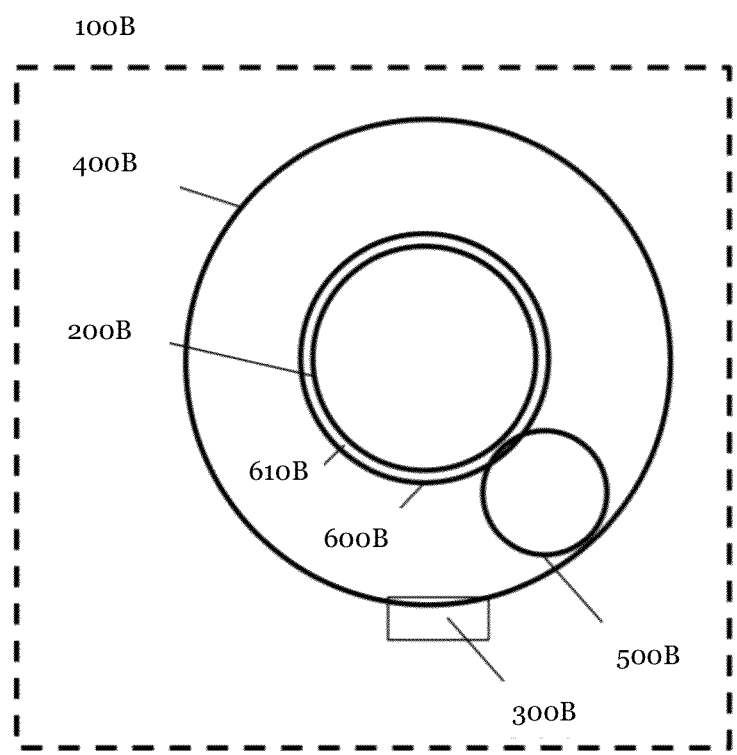
Figure 2:
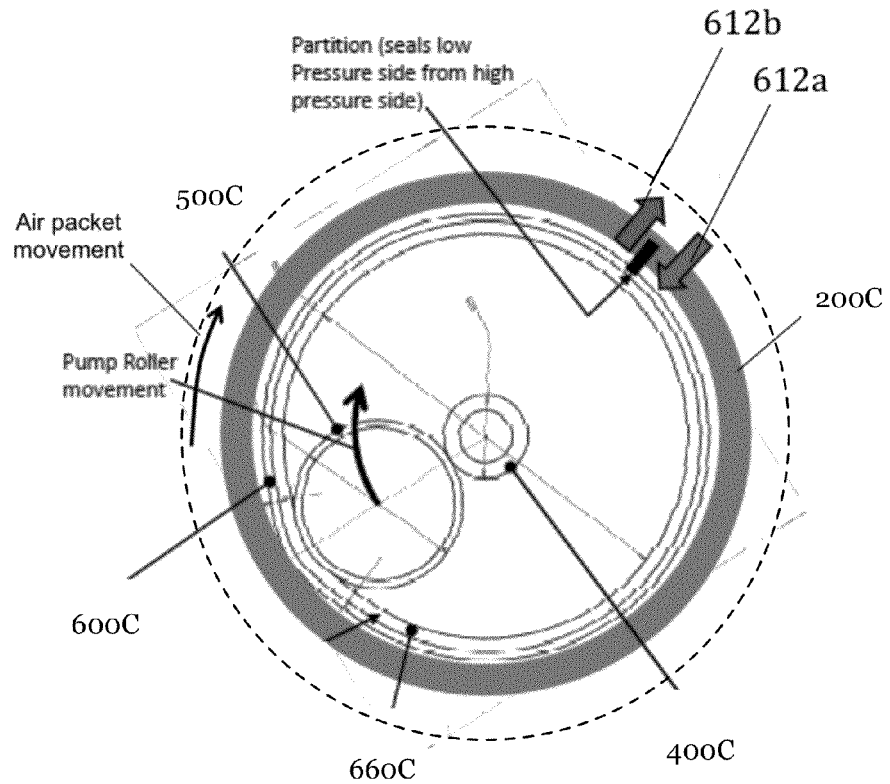

As shown in FIGS. 1A, 1B, 5B, 10A and 13A, the tire inflation system 100 of the preferred embodiments includes a rotating ring 200, an eccentric mass 300, a positioning mechanism 400, a roller element 500, and a flexible diaphragm 600 that defines a pump cavity 610. The tire inflation system 100 is preferably coupled to a rotating wheel 50, wherein the rotating ring 200 rotates with the rotating wheel 50 while the eccentric mass 300 maintains the angular position of the positioning mechanism 400, engendering relative motion between the rotating ring 200 and the eccentric mass 300 and/or positioning mechanism 400. The tire inflation system 100 functions to translate this relative movement to mechanical work (and, potentially, to other energy forms). The tire inflation system 100 preferably pumps a fluid from the ambient environment into the tire of a wheel by applying an occluding force against the diaphragm 600, periodically occluding portions of the pump cavity 610, in a manner similar to a rotary diaphragm pump (e.g. as shown in FIG. 2). The tire inflation system 100 is preferably coupled to the hub or rim of a wheel, such as that of a truck, compact vehicle, motorcycle or bicycle, but may alternately be coupled to any surface capable of rotating, such as that of a water turbine or a windmill. The tire inflation system 100 is preferably a planetary system, wherein the relative diameters between the rotating ring 200, the positioning mechanism 400, and the roller element(s) 500 collaborate to achieve the desired gear ratio and pumping speed. However, the pumping rate, pressure, and frequency may also be controlled with a passive or an active control mechanism.

Figure 3A:
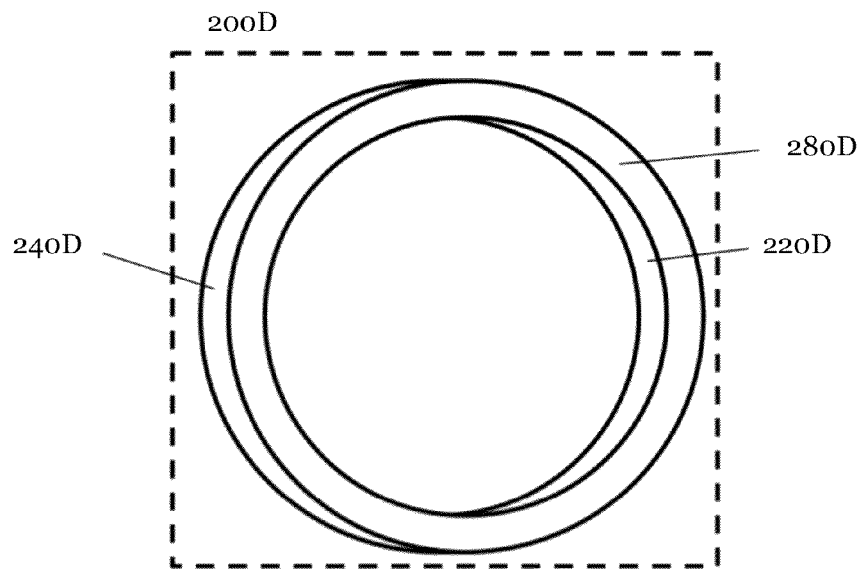
Figure 3B:
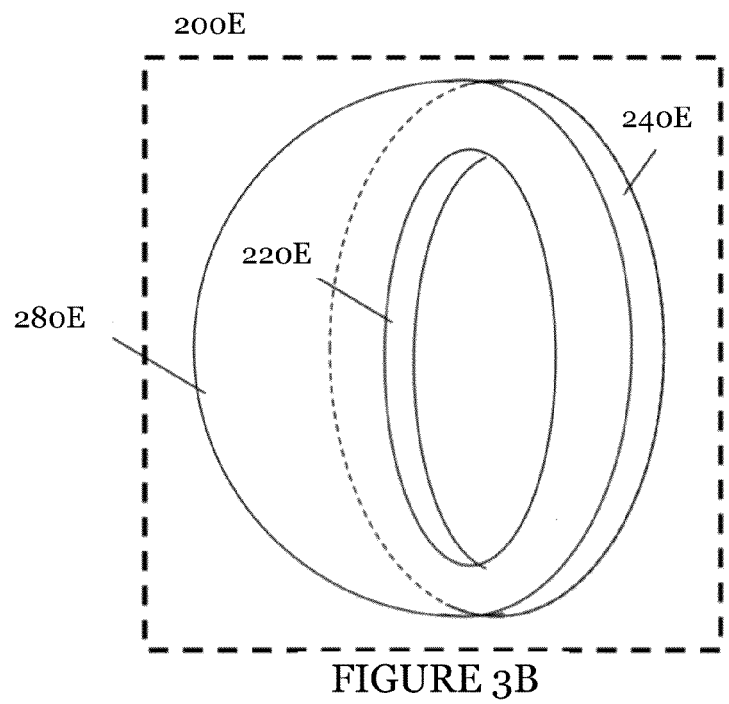
Figure 3C:
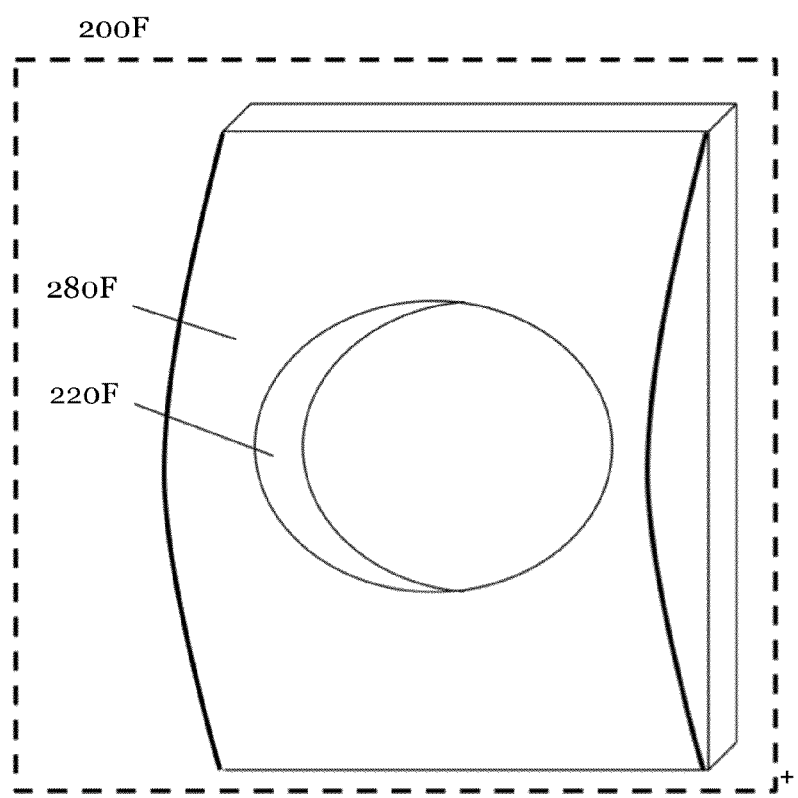

The rotating ring 200 of the tire inflation system 100 functions to apply an occluding force against the diaphragm 600. The rotating ring 200 (also referenced as a "pumping ring") also functions to provide a smooth bearing surface for the roller element 500, and may additionally contain or constrain the other components of the tire inflation system 100. The rotating ring 200 preferably rotates with the rotating wheel 50, and is preferably statically, but removably, coupled to the rotating wheel 50. However, the rotating ring 200 may alternately be coupled to the rotating wheel such that the rotating ring 200 revolves about the wheel center of rotation (such that a point on the rotating ring 200 traces a peritrochiod curve about the wheel center), or coupled to the rotating wheel in any suitable manner. The rotating ring 200 preferably encircles the positioning mechanism 400 and applies an inward radial force against the roller when assembled, wherein the inward radial force is preferably enough to maintain the rotating ring 200, the roller, and the positioning mechanism 400. However, the rotating ring 200 may be disposed within the positioning mechanism 400 circumference, and may apply an outward radial force against the roller(s) 500 when assembled. The bearing surface (preferably the inner radial surface 220, but alternately the outer radial surface 240 or the face surface 280) of the rotating ring 200 are preferably smooth, but may alternately include a circumferential groove 620, wherein the groove 620 is preferably located on the radial surface most proximal to the eccentric mass 300. As shown in FIG. 3A, the surface of the rotating ring 200C normal to the bearing surface (also referenced as a "face surface 280") is preferably flat, such that the rotating ring 200C is cylindrical. However, the face surface 280 may alternately be hemispherical or curved (as shown in FIGS. 3B and 3C, respectively). The rotating ring 200 is preferably a substantially circular ring, but may alternately be an oblong ring or an asymmetric ring. The rotating ring 200 preferably has a substantially homogeneous weight distribution, such that no portion of the ring is substantially heavier than another portion. The rotating ring 200 is preferably substantially rigid, and is preferably made of metal (e.g. stainless steel, and aluminum), but may alternately be made of a rigid polymer (e.g. polyacetylenes, polyfluroenes, nylon, and polyimides), or made of ceramic. However, the rotating ring 200 may alternately be flexible, and made of rubber or plastic. The rotating ring 200 is preferably extruded, but may alternately be welded, stamped, sintered, or use any suitable manufacturing method. The rotating ring 200 may additionally include an internal channel that contains Dynabeads or other dynamic balancing mechanisms. The tire inflation system 100 preferably includes one rotating ring 200, but may alternately include multiple rotating rings 200.

As shown in FIGS. 1A, 1B, 5B, 10A and 13A, the eccentric mass 300 of the tire inflation system 100 functions to substantially overcome the inertia and friction generated by the rotation of the rotating ring 200 and rotating wheel 50, such that the eccentric mass 300 stays substantially static while the rotating ring 200 rotates. More preferably, the eccentric mass 300 is coupled to the positioning mechanism 400 to form a positioning system 320, and preferably maintains the angular position of the positioning mechanism 400 relative to the road surface (which is contacted by the wheel 50) as the wheel 50 is rotating by providing a torque, generated by gravity, that opposes the rotation of the positioning mechanism 400 with the wheel. In other words, the eccentric mass 300 preferably substantially prevents the positioning mechanism 400 from rotating with the wheel 50 and rotating ring 200 by shifting the center of mass of the positioning system 320 away from the center of rotation of the positioning system 320 (the center of rotation of the positioning mechanism 400). This relative motion, enabled by the gravitational pull on the eccentric mass 300, is leveraged by the tire inflation system 100 to do mechanical work. This relative motion occurs because the center of mass of the eccentric mass 300 (and the positioning mechanism 400 to which it is coupled) is not located at the center of rotation, such that the pull of gravity on the eccentric mass 300 causes the mass to stay substantially static relative to the road surface while the rotating ring 200 rotates relative to the surface. The mass of the eccentric mass 300 is preferably large enough to generate the amount of power desired, in addition to being large enough to overcome friction and to adequately dampen induced oscillations resulting from non-rotating motion (e.g. from bumps). The eccentric mass 300 preferably possesses a profile similar to a radial section of the rotating ring 200, but may alternately be rectangular, spherical, or amorphous. The eccentric mass 300 is preferably made of metal such as stainless steel, copper or aluminum, but may alternately be made of plastic, ceramic, or a fluid such as a gel. The eccentric mass 300 is preferably manufactured independently, but may alternately be manufactured with the positioning mechanism 400 or by modifying a portion of the positioning mechanism 400.

Figure 5A:
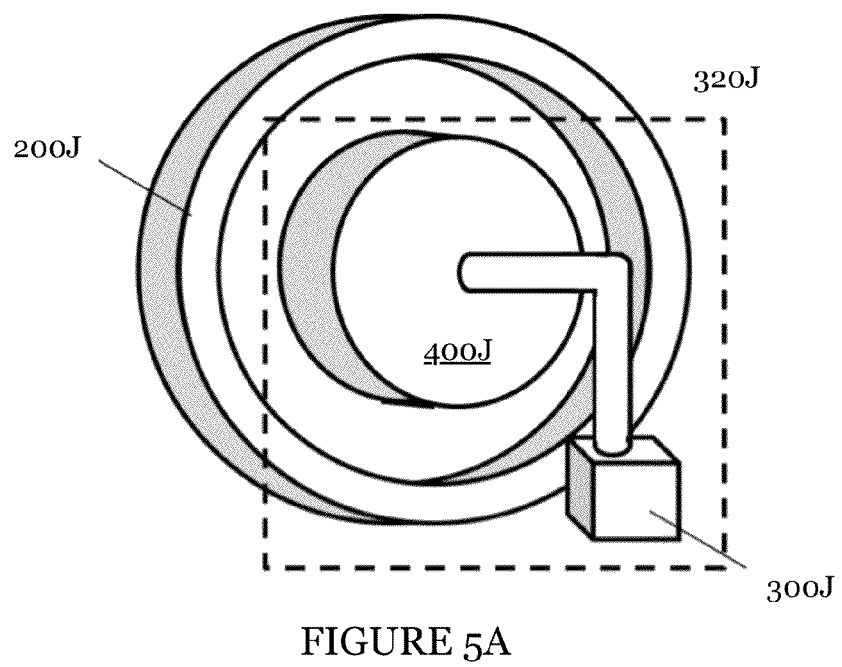

The positioning mechanism 400 of the tire inflation system 100 functions to provide a bearing surface for roller element 500 rotation and to support the eccentric mass 300. The positioning mechanism 400 may also function to orient the eccentric mass 300 relative to the rotating ring 200. The positioning mechanism 400 may also function as the sun gear or the outer gear for the system 100, wherein the roller element 500 revolves within or around the positioning mechanism 400. The gear ratio for the system 100 may be controlled by the diameter of the positioning mechanism 400. The positioning mechanism 400 is preferably a cylinder, but may alternately be a ring, more preferably a flat ring, wherein the ring has a circular profile, a triangular profile, or any suitable profile. Alternately, the positioning mechanism 400 may be a lever arm extending from the rotating ring 200 center of rotation to the rolling element 500 (wherein the rolling element may be the eccentric mass 300), or any other suitable positioning mechanism 400. As shown in FIG. 5A, the positioning mechanism 400 (e.g. gravity ring 420) is preferably disposed concentrically within the rotating ring 200, but may alternately be disposed concentrically outside the rotating ring 200, eccentrically within the rotating ring 200 such that the positioning mechanism 400 shares a center of rotation with the wheel 50, or may have a center of rotation eccentric to the wheel center of rotation. The positioning mechanism 400 may alternately be parallel to the face surface 280 of the rotating ring 200, wherein the positioning mechanism 400 preferably has a diameter substantially similar to the diameter of rotating ring 200. The position of the positioning mechanism 400 is preferably fixed relative to the wheel center of rotation and/or the rotating ring 200 center of rotation (e.g. rotatably fixed to a backplate shared by the rotating ring 200 and the positioning mechanism 400), but may alternately be unfixed relative to the rotating ring 200, such that the position of the positioning mechanism 400 is determined by the roller element 500 positioning. The tire inflation system 100 preferably includes one positioning mechanism 400, but may alternately include multiple positioning mechanisms 400.

Figure 4A:
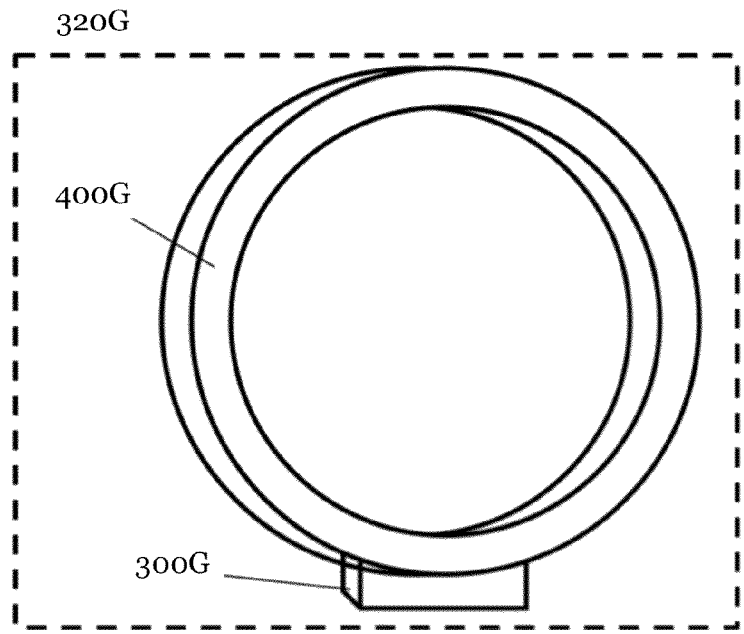
Figure 4B:
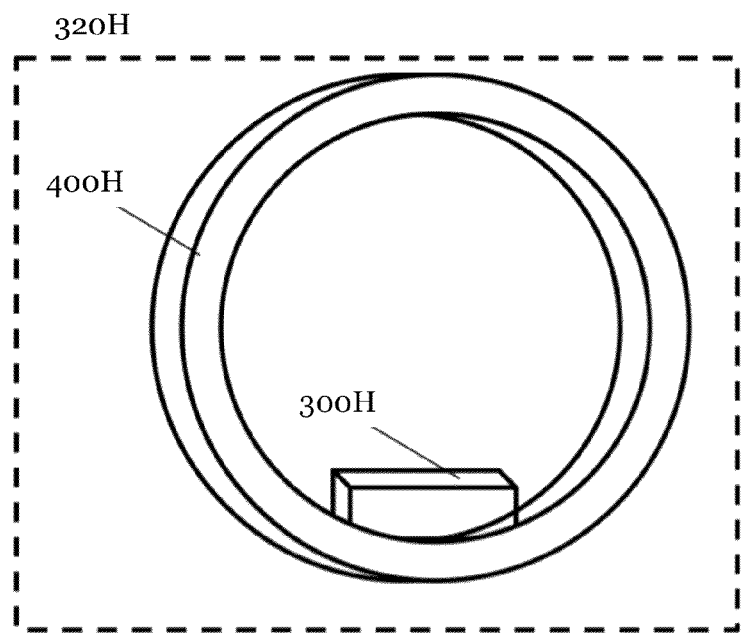
Figure 4C:
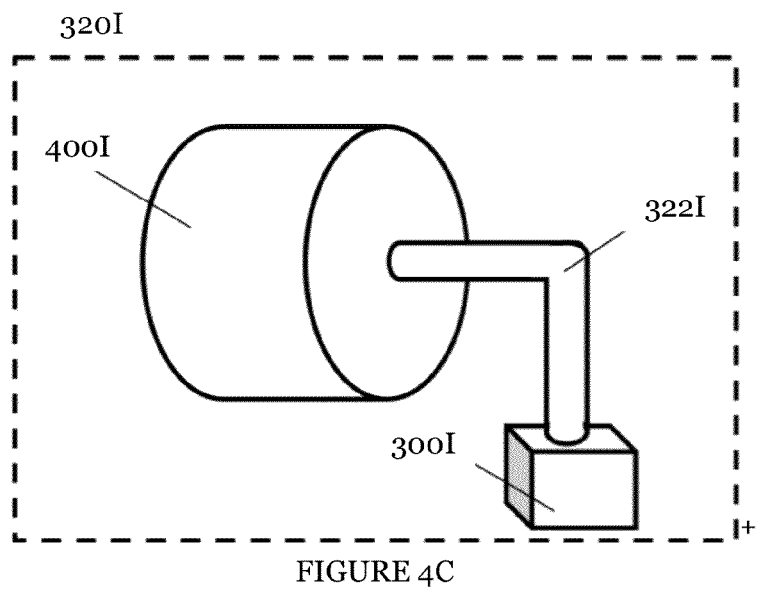

The eccentric mass 300 of the tire inflation system 100 is preferably statically coupled to the positioning mechanism 400 to form the positioning system 320, and is preferably coupled to the positioning mechanism 400 center of rotation, but may alternately be coupled eccentrically to the center of rotation for the positioning mechanism 400. The eccentric mass 300 is preferably coupled to a non-bearing surface of the positioning mechanism 400 (e.g. the flat face of the positioning mechanism 400), but may alternately be coupled to a bearing surface or comprise a bearing surface of the positioning mechanism 400. As shown in FIG. 4C, the eccentric mass 300 is preferably coupled to the positioning mechanism 400 by a lever arm 322, such that the eccentric mass 300 is out of the plane of roller element 500 and/or rotating ring 200 rotation. However, as shown in FIGS. 4A and 4B, the eccentric mass 300 may be statically coupled to a radial surface (either the inner or outer radial surface) of the positioning mechanism 400, such that it protrudes from the positioning mechanism 400. Alternately, the eccentric mass 300 may be incorporated into the positioning mechanism 400, wherein a radial section of the positioning mechanism 400 is denser than the rest but retains substantially the same radius as the other sections, such that the inner and outer radial surfaces of the positioning mechanism 400 are substantially smooth. The smooth incorporation of the eccentric mass 300 into the positioning mechanism 400 is preferably accomplished by replacing a radial section of the positioning mechanism 400 with a denser material, but may alternately be accomplished by embedding the radial section with a denser element, machining the cross sectional area of the radial section and coating it with a dense material, or any other suitable method of creating an eccentric mass 300 on the positioning mechanism 400. The positioning mechanism 400 may additionally include an internal channel, running along the circumference of the positioning mechanism 400, that may contain Dynabeads or any other dynamic balancing mechanism. The positioning mechanism 400 may alternately slidably couple the eccentric mass 300 directly to the rotating ring 200, wherein the positioning mechanism 400 is a pair of guide rails that bridge the inner and outer radial surfaces of the rotating ring 200 such that the rotating ring 200 slides within the guides, or support bars that extend from the eccentric mass 300 to the distal radial surface of the rotating ring 200. The positioning mechanism 400 may alternately include rollers that allow the rotating ring 200 to move relative to the eccentric mass 300, or magnetic rollers that couple the rotating ring 200 to the eccentric mass 300 while allowing the rotating ring 200 to slide along the eccentric mass 300 with minimal frictional resistance. The positioning mechanism 400 is preferably manufactured with the eccentric mass 300 as a single piece, but may alternately be welded, screwed, glued, or use any other means of coupling to the eccentric mass 300. The positioning mechanism 400 is preferably rigid and made of metal (e.g. stainless steel, aluminum), but may alternately be made of a polymer (e.g. polyacetylenes, polyfluroenes, nylon, polyimides), of ceramic, or of any combination thereof. The positioning mechanism 400 may alternately be flexible, and made of rubber or plastic. The tire inflation system 100 preferably includes one positioning system 320, but may alternately include multiple positioning systems 320.

Figure 6A:
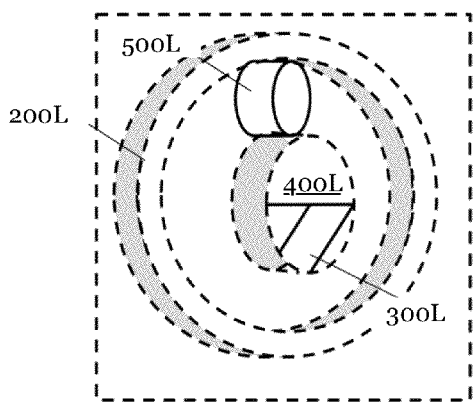
Figure 6B:
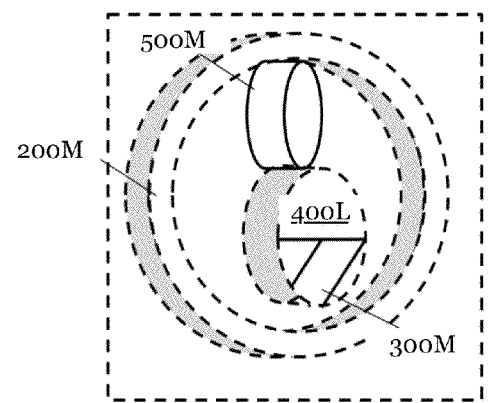

The roller element 500 of the tire inflation system 100 functions to harness the relative motion between the eccentric mass 300 and the rotating ring 200 to accomplish mechanical work. The roller element 500 may additionally be a planetary roller, wherein the gear ratio of the system 100 may be controlled through the roller element diameter. The roller element 500 preferably performs mechanical work by providing a force against the bearing surface of the rotating ring 200. The roller element 500 preferably accomplishes this by rolling in a planetary manner about the positioning mechanism 400 as the rotating ring 200 rotates, and is preferably braced between the rotating ring 200 and the positioning mechanism 400. The roller element 500 rolls because it is preferably in non-slip contact with both the rotating ring 200, which is rotating with the rotating wheel 50, and with the positioning mechanism 400, which is substantially stationary due to gravity acting on the eccentric mass 300. The roller element 500 is preferably has a diameter approximately half the distance between the positioning mechanism 400 and the rotating ring 200, or slightly larger (as shown in FIG. 6A, roller element 500A). However, the roller element 500 may alternately have a diameter substantially larger than half this distance, such that the positioning mechanism 400 is eccentrically oriented relative to the rotating ring 200, and a point on the rotating ring 200 traces a peritrochiod path about the positioning mechanism 400 (as shown in FIG. 6B, roller element 500B). The roller element 500 may alternately have a diameter smaller than half the annular distance. The roller element may alternately include an inner and an outer roller concentrically and rotatably coupled together, wherein the inner roller couples to the bearing surface of the rotating ring 200 and the outer roller couples to the bearing surface of the positioning mechanism 400, or vice versa. In this embodiment, the relative diameters of the inner and outer rollers may control the gear ratio of the system 100. The roller elements 500 may additionally be spacer rollers 520 that function to retain non-slip contact between the roller element 500, the positioning mechanism 400, and the rotating ring 200, but do not provide a direct occluding force. The tire inflation system 100 preferably includes one roller element 500, but may alternately include two, three, five, or any suitable number of rollers. The roller element 500 is preferably disposed between the rotating ring 200 and the positioning mechanism 400, wherein the positioning mechanism 400 is smaller than and concentric with the rotating ring 200, such that the roller element 500 is disposed between the convex bearing surface (i.e. outer radial surface) of the positioning mechanism 400 and the concave bearing surface (i.e. inner radial surface 220) of the rotating ring 200. The roller element 500 may alternately be disposed between the concave bearing surface of the positioning mechanism 400 and the convex bearing surface of the rotating ring 200, wherein the positioning mechanism 400 is larger than the rotating ring 200. Alternately, the roller element 500 may be disposed between the face of the positioning mechanism 400 and the bearing face 280 of the rotating ring 200. The roller element 500 may alternately be coupled to the positioning mechanism 400 such that it can roll but not change position relative to the eccentric mass 300. This embodiment is particularly useful when a single roller element 500 is used in the tire inflation system 100, as the roller element 500 is preferably coupled to the eccentric mass 300 in a position to maintain the roller force against the rotating ring 200. This embodiment may additionally include a set of support bars that extend from the eccentric mass 300, span the thickness of the rotating ring 200 and couple with the central axis of the roller element 500, such that the eccentric mass 300 is suspended on the outer radial surface 240 of the rotating ring 200. This embodiment may alternately include a magnetic roller element 500 coupled to a magnetic eccentric mass 300, wherein the magnetic attraction between the roller element 500 and the eccentric mass 300 function to constrain the roller element 500 in a particular position. The roller elements 500 are preferably cylinders, and disposed such that they roll along the bearing surface of the rotating ring 200. However, the rollers may alternately be rings, spheres, obloids, or any suitable shape that allows for the roller element 500 to roll along a curved surface. The roller element 500 may alternately be a friction block, wherein the roller element 500 slides along the bearing surface instead of rolling. The rollers are preferably made of wear-resistant material, such as metal or a durable polymer, but may alternately be soft materials coated with a wear-resistant layer.

Figure 7A:
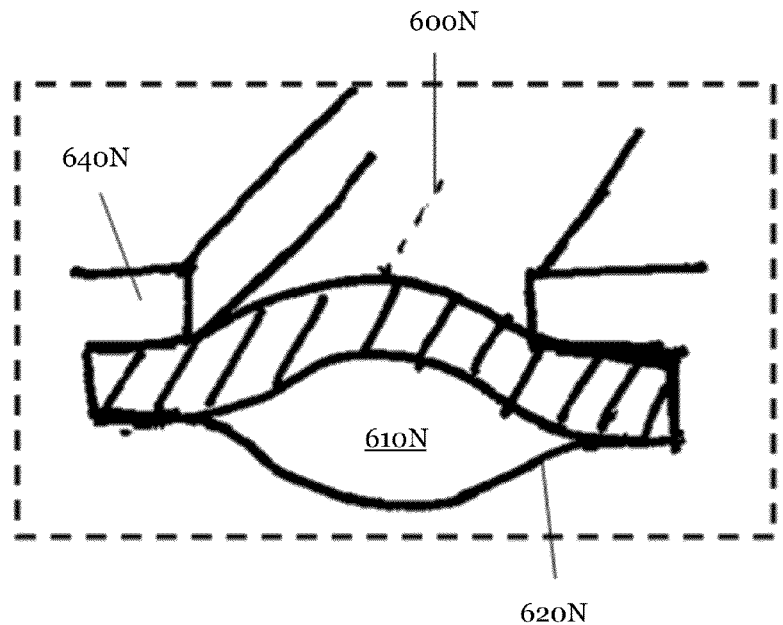
Figure 7B:
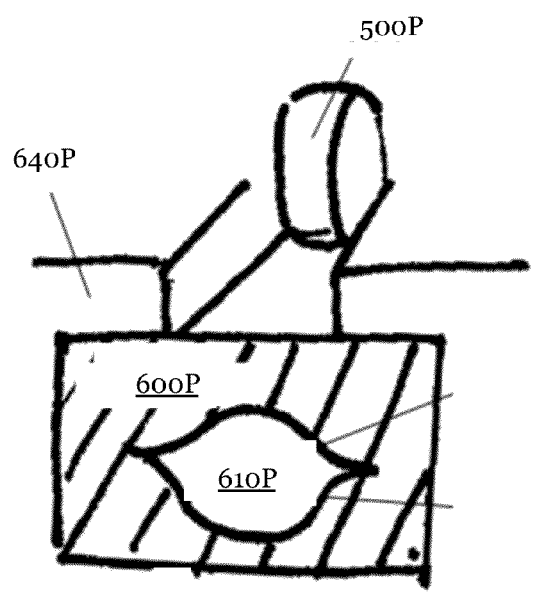
Figure 7C:
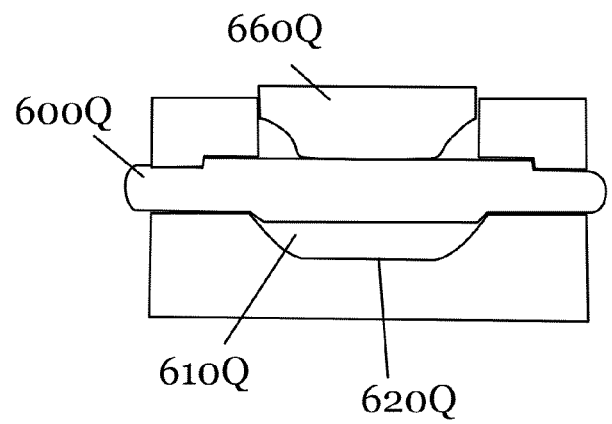
Figure 7D:
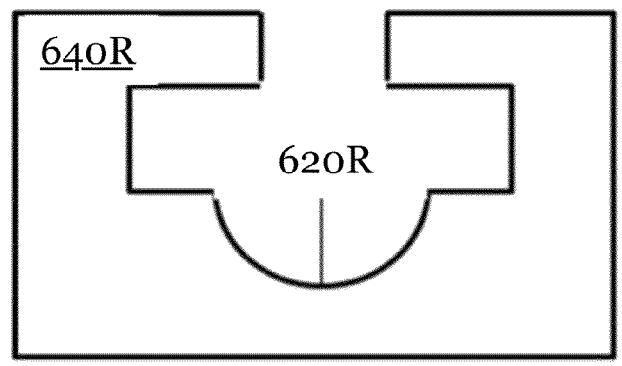
Figure 7E:
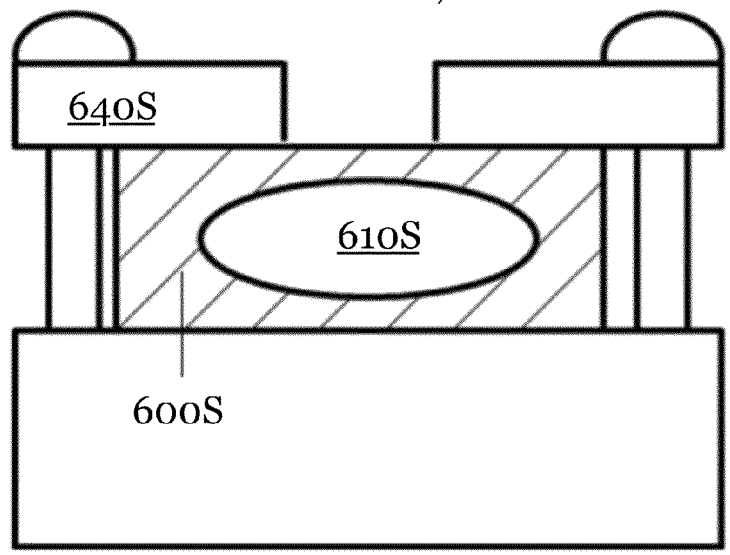

The diaphragm 600 of the tire inflation device 100 functions to define a pump cavity 610 that holds a fluid, and to provide a deformable interface that occludes the pump cavity 610. The diaphragm 600 preferably defines a pump cavity itself, as shown in FIG. 7B (pump cavity 610B), wherein the diaphragm 600 comprises a tube with an amygdaloidal cross section, a tube with a circular cross section, or a sheet folded over itself. However, the diaphragm 600 may alternately define a pump cavity 610 in conjunction with a groove 620, as shown in FIG. 7A (pump cavity 610A), wherein the groove 620 forms a portion of the pump cavity 610 and the diaphragm 600 seals the pump cavity 610 by sealing the groove 620 opening. The groove 620 is preferably a curved groove 620, more preferably a groove 620 formed with a smooth bell shape. In the latter embodiment, the diaphragm 600 is preferably a sheet, but may alternately be a continuous ring or any suitable shape. As shown in FIGS. 7A-7E, the diaphragm 600 is preferably coupled to the groove 620 with diaphragm restraints 640, wherein the diaphragm restraints 640 maintain diaphragm 600 position relative to the groove 620 and prevent fluid leakage by preventing diaphragm 600 separation from the groove 620. The diaphragm restraints 640 preferably comprise two pieces that snap over the groove 620, near the groove 620 edges, and squeeze the diaphragm 600 to retain the diaphragm position. However, the diaphragm restraints 640 may comprise pieces that are screwed into the sides of the grooves 620 (as shown in FIG. 7E diaphragm restraints 640B), adhered to the sides of the grooves 620, or are integral pieces with the piece that forms the groove 620 (as shown in FIG. 7D, diaphragm restraints 640A). The diaphragm 600 may also be configured to produce suction of fluid into the pump cavity 610. This is preferably accomplished by pre-stretching the diaphragm 600. The diaphragm 600 is preferably stretched in the radial direction (e.g. longitudinally, along the pump cavity 610 length), but may alternately and/or additionally be stretched in the axial direction (i.e., along the width of the pump cavity 610). A pre-stretched diaphragm 600 is preferably achieved by stretching a ring of diaphragm material over an actuator support, such that the diaphragm 600 pulls away from the groove 620. However, the diaphragm 600 may be coupled (e.g. adhered, stapled, etc.) to an actuating strip that pulls the diaphragm 600 to a suction position after deformation, or include any other suitable method of achieving suction within the pump cavity 610. The diaphragm 600 preferably comprises a flexible, elastomeric material such as rubber, but may alternately comprise thermosets, thermoplatstics, any suitable material. Such materials include Santoprene, polyurethane, nitrile rubber, silicone rubber, or Elastron. As shown in FIG. 8A, the pump cavity 610D is preferably disposed between the rotating ring 200 and an occluding element, wherein the rotating ring 200 applies an occluding force, preferably a normal or radial occluding force, against a section of the diaphragm 600 to deform said section that, in turn, occludes a corresponding section of the pump cavity 610. The pump cavity 610 is preferably disposed along the bearing surface of the rotating ring 200, wherein the roller element 500 is the occluding element and occludes successive sections of the pump cavity 610 against the rotating ring 200 as the roller element 500 revolves about the rotating ring 200. More preferably, the pump cavity 610 is disposed within a circumferential groove 620, wherein the groove 620 is located on the radial surface most proximal to the positioning mechanism 400. However, the pump cavity 610 may be disposed along the face surface 280 of the rotating ring 200, wherein the pump cavity 610E is occluded between the rotating ring 200 and a brace plate (as shown in FIG. 8B). The brace plate may additionally include a groove 620 in which the pump cavity 610 is disposed. In this embodiment, pump cavity 610 preferably traces the circumference of the face surface 280 of the rotating ring 200, but may alternately cover half the face surface 280, all of the face surface 280, or any suitable portion of the face surface 280. The pump cavity 610 may alternately be disposed in any suitable location within the system. The pump cavity 610 is preferably fluidly coupled to ambient air at one end (also referenced as the "inlet"), and fluidly coupled to a reservoir (e.g. the tire interior, or a reservoir fluidly coupled to the tire interior) at the other end (also referenced as the "outlet"). The pump cavity 610 preferably does not include valves at the inlet or the outlet, but may alternately include an inlet valve 612a that permits fluid ingress and/or egress into/from the pump cavity 610 and an outlet valve 612b that permits fluid egress and/or ingress from/to the pump cavity 610. These valves may be check valves, ball valves, diaphragm 600 valves, or any suitable passive or active valve.

Figure 9A:
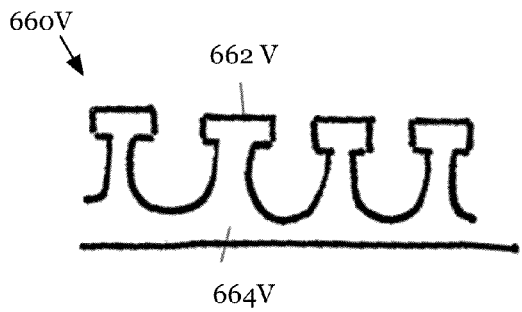
Figure 9B:
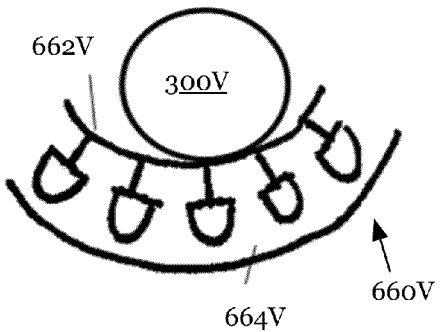
Figure 9C:
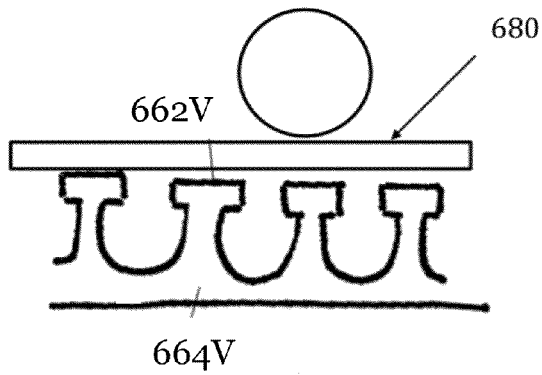
Figure 9D:
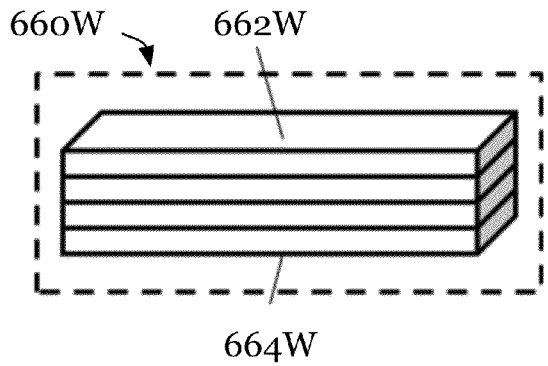

As shown in FIGS. 9A-9D, the tire inflation system 100 may additionally include an actuator strip 660. The actuator strip 660 functions to decrease wear on the diaphragm 600 as well as to transfer the occluding force applied by the roller element 500 to the upper half of the pump cavity 610. The actuator strip 660 preferably decreases the wear on the diaphragm 600 by decoupling the occluding element form the diaphragm 600, which minimizes the effect of rolling friction on the diaphragm 600 as well as decreases the stress concentration of the occluding force on the diaphragm 600 by diffusing the occluding force over a larger area. The actuator strip 660 is preferably located between the pump cavity 610 and the occluding element, such that an occluding force is first applied to the actuator strip 660, which then transmits the force to the pump cavity 610. For example, the actuator strip 660 may be located between the roller element 500 and the diaphragm 600, or may be located between the rotating ring 200 and the diaphragm 600. The actuator strip 660 is preferably constrained with respect to the pump cavity 610, such that it does not shift or slide against the pump cavity 610. This is preferably achieved by constraining the ends of the actuator strip 660 with the diaphragm restraint 640, such that the ends of the actuator strip 660 are constrained between the upper portion and the lower portion of the diaphragm restraint 640, or inserted into the lower portion of the diaphragm restraint 640. However, the actuator strip 660 may alternately be restrained along the longitudinal edges, wherein a portion of the actuator strip 660 is located between the upper portion of the diaphragm restraint 640 and the diaphragm 600. Alternately, the actuator strip 660 may not be mechanically restrained at all. The actuator strip 660 is preferably a continuous ring, but may alternately be a long, thin strip. The length of the actuator strip 660 is preferably slightly longer than the length of the pump cavity 610, but may alternatively be the same length as the pump cavity 610. The height of the actuator strip 660 is preferably substantially equivalent to the material thickness of the upper portion of the diaphragm restraint, but may alternatively be shorter or taller than the thickness. As shown in FIGS. 9A and 9B, the actuator strip 660 preferably includes a bearing component and an occluding component, wherein the roller element 500 rolls along the bearing component and the occluding component transfers the occluding force (provided by the roller element 500 contact) to occlude the upper half of the pump cavity 610. The bearing component preferably includes a series of smooth, flat surfaces that transiently couple together to form an arc when the roller element 500 passes by, but may alternatively include a single smooth, flat surface, a single smooth curved surface, or any surface that facilitates unobstructed roller element 500 rolling over the actuator strip 660. The occluding component is preferably a continuous, flexible strip the length of the actuator strip 660, but may alternatively be a series of rods or flat strips running along the length of the actuator strip 660. The width of the occluding component is preferably less than the width of the pump cavity 610. More preferably, the width of the occluding component is approximately 25% of the width of the pump cavity 610, and fits within the occluding gap. The diaphragm-contacting face of the occluding component 660 preferably includes geometry that substantially seals the pump cavity 610 along its width (as shown in FIG. 7C). Such geometry includes a flattened bell-like cross section, wherein the body of the flattened bell substantially compliments the lower half of the pump cavity 610 (e.g. the groove 620 cross section) and the tails of the bell substantially compliments the edges of the pump cavity 610 lower half (e.g. the outer edges of the groove 620), wherein all edges are preferably rounded. However, the diaphragm-contacting face of the occluding component may alternatively be rounded to fit the profile of the lower half of the pump cavity 610, be flat with rounded edges or substantially flat with angled edges (e.g. sharp edges). As shown in FIGS. 9A and 9B, the actuator strip 660 preferably includes a series of T-shaped protrusions linked by a continuous strip at the stems of the Ts, wherein the connection between the T stems are curved (FIG. 9A). The top of the Ts form the bearing surface 662, and the continuous linking strip forms the occluding component 664 (FIG. 9B). The actuator strip 660 of this embodiment is preferably stamped as a single piece, but may alternatively be sintered, extruded or molded. The actuator strip 660 is preferably made of a wear-resistant, flexible material, such as nylon, PEEK or Nitinol. However, as shown in FIG. 9D, the actuator strip 660 may alternately include a series of laminated strips, wherein each strip is the length of the actuator strip 660 and the lamination surfaces of the strips run perpendicular to the occlusion force application direction. In this embodiment, the layers of the actuator strip 660 are preferably made of the same material, but may alternately be made of different materials with different elasticities and wear properties. Examples of preferred materials include nylon, PEEK, nitinol, and rubber. The strips are preferably held in place by the diaphragm restraint 640, but may alternatively be laminated with a flexible lamination such as rubber glue. As shown in FIG. 9C, the actuator strip 660 may additionally include a surface strip 680, which functions to prevent over-stressing of the actuator strip 660 during deflection. The surface strip 680 preferably lies on the top surface of the actuator strip 660, and is preferably restrained such that it remains aligned with the actuator strip 660 and roller element 500, and is slidably coupled to the top surface of the actuator strip 660 during operation. The surface strip 680 is preferably made of a similar material as the actuator strip 660, but may alternatively be made of a different material. The length of the surface strip 680 is preferably similar to that of the actuator strip 660, but may alternately be longer or shorter than the actuator strip 660. The width of the surface strip 680 is preferably four times wider than the actuator strip 660, but may alternatively be wider or narrower. The thickness of the surface strip 680 is preferably as thick as allowable by the fatigue strength of the material, but may alternately be 1.5 the thickness of the continuous linking strip, thinner or thicker.

Figure 10A:
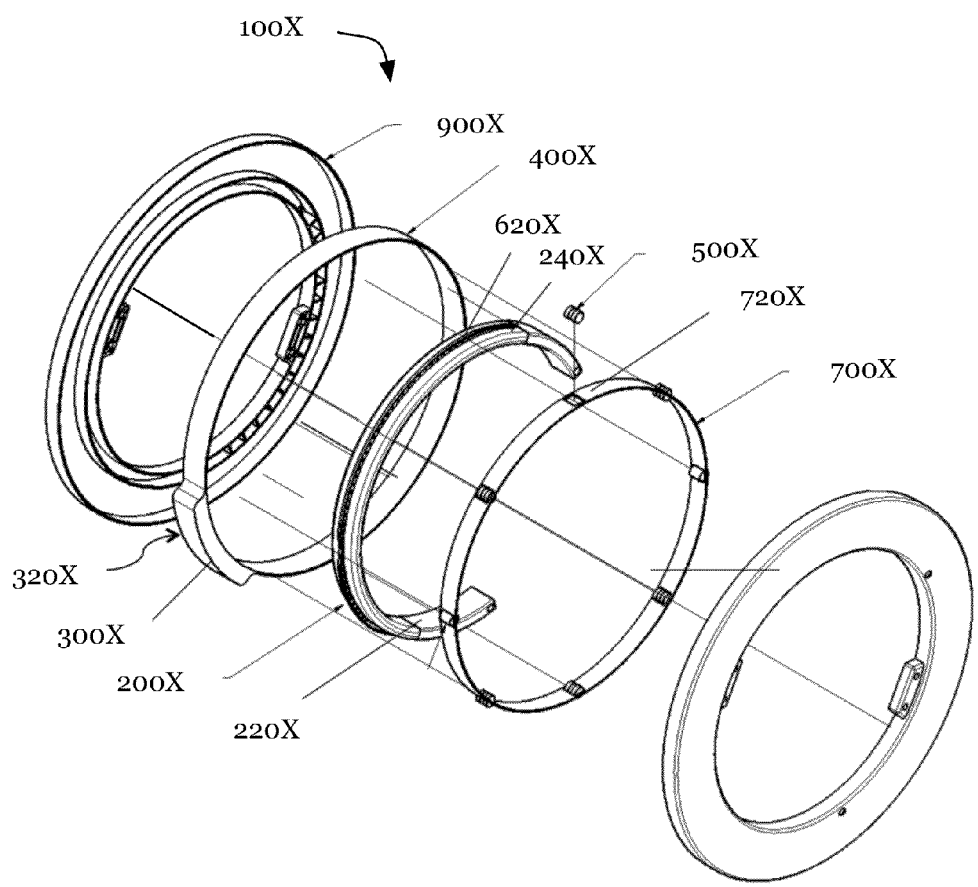

As shown in FIGS. 10A, 10B, and 10C, the tire inflation system 100D may additionally include a retainer ring 700, which functions to maintain the spacing between multiple roller elements 500. The retainer ring 700 preferably has a diameter between that of the positioning mechanism 400 and the rotating ring 200, such that it fits concentrically between the two rings. As shown in FIG. 10A, the retainer ring 700 is preferably a solid ring with periodic cutouts 720 through its thickness, wherein the shape of the cutouts 720 resemble the cross section of the roller element 500 along the length of the central axis of the roller element 500. The roller elements 500 fit into these cutouts 720, such that they are constrained on at least six sides when the tire inflation system 100 is assembled: two pairs of opposing sides by the four sides of the cutout, one side by the bearing surface of the positioning mechanism 400, and another side by the bearing surface of the rotating ring 200. The widths of the cutouts 720 are preferably slightly larger than the diameter of the roller elements 500, but may alternately be smaller than the diameter of the roller elements 500. The cutouts 720 are preferably oriented such that the length of the cutout is parallel to the central axis of the retainer ring 700, but may alternately be oriented such that the length of the cutout is perpendicular to the central axis of the retainer ring 700. The number of cutouts 720 is preferably equal the number of roller elements 500, but may alternately be more than the number of roller elements 500. The cutouts 720 are preferably spaced equally about the circumference of the retainer ring 700, but may alternately be unequally spaced about the retainer ring 700. The retainer ring 700 is preferably rigid, but may alternately be flexible. The retainer ring 700 is preferably made of polymer such as PVC or PEEK, but may alternately be made of a metal such as nitinol or stainless steel, or ceramic.

As shown in FIG. 11A, the tire inflation system 100 may additionally include an occluding ring 800 that functions to translate rotating ring 200 rotation into an occluding force that occludes the pump cavity 610. By using the occluding ring 800, the rotating ring 200 may apply an occluding force to a pump cavity 610 in a plane different from the rotating plane. For example, the occluding force is preferably applied in a substantially normal direction to the plane of rotating ring 200 revolution. The occluding ring 800 is preferably utilized with a rotating ring 200 with a hemispherical face surface 280, wherein the occluding ring 800 preferably traces the circumference of the rotating ring 200. However, the occluding ring 800 may also be utilized with a rotating ring 200 with a curved face surface 280, wherein the occluding ring 800 preferably traces perimeter or a portion of the perimeter of the face surface 280, but may alternately cover the entire face surface 280. The occluding ring 800 may alternately have any other suitable form. The occluding ring 800 is also preferably utilized with a roller element 500 with a diameter larger than the annular distance between the positioning mechanism 400 and the rotating ring 200, such that the rotating ring 200 revolves in a first plane about the positioning mechanism 400 in an elliptical, peritrochiod path. The occluding ring 800 preferably couples to the curved face surface 280 of the rotating ring 200 in a ball-joint-like manner, wherein the occluding ring 800 is the joint and the face surface 280 of the rotating ring 200 is the ball. The occluding ring 800 is preferably restrained in the radial direction by an occluding ring restraint 820 (e.g. a wall encircling the occluding ring 800, the housing, etc.), but is free to move along the face surface 280, such that movement of the rotating ring 200 forces the occluding ring 800 to move along the face surface 280. In other words, the occluding ring 800 cannot translate in a plane parallel to the first plane, but can slide along the face surface 280 to move in and out of the parallel plane. As the occluding ring 800 moves out of the parallel plane, the occluding ring 800 preferably applies an occluding force to the pump cavity 610, wherein the pump cavity 610 is disposed along the face surface 280 of the rotating ring 200 with the occluding ring 800 therebetween. The occluding ring 800 is preferably a ring, but may alternately be a plate or any suitable occluding configuration. The occluding ring 800 is preferably substantially stiff and rigid, but may alternately be viscoelastic, flexible in the radial direction and stiff in the longitudinal, flexible in all directions, or any suitable elasticity. The occluding ring 800 preferably comprises metal, but may comprise plastic, elastomer, ceramic, or any suitable material, and may be welded, sintered, injection molded, or manufactured with any suitable method. The interface between the occluding ring 800 and the face surface 280 preferably includes lubricant, bearings, or any suitable mechanism to facilitate easy translation along the surface. The interface between the occluding ring 800 and the diaphragm 600 may additionally include an actuator strip 660 and/or a surface strip 680 to reduce friction on the diaphragm 600.

Figure 5B:
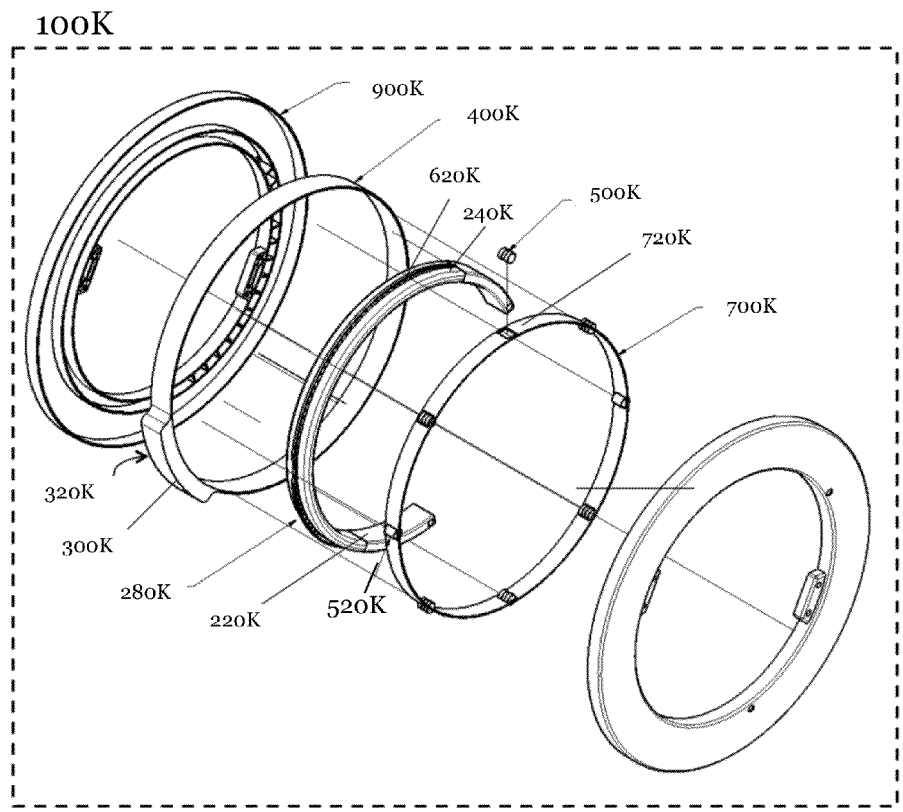

As shown in FIG. 5B, the tire inflation system 100C may additionally include a housing 900, which functions to contain, mechanically protect, and provide structural support for the components of the tire inflation system 100, as well as to prevent fluid ingress into tire inflation system 100. The housing 900 is preferably circular, with a diameter larger than the largest dimension of the tire inflation system 100 components, such that all the components may fit into the housing 900. The housing 900 preferably encapsulates the tire inflation system 100 components on all sides when in use, but may additionally include a cover or a tray to allow access to the tire inflation system 100 components. The housing 900 is preferably substantially rigid, and is preferably composed of plastic, but may alternately be composed of metal or ceramic. The housing 900 preferably includes mounting points 726 that allow the tire inflation system 100 to couple to the mounting mechanism 700, wherein the mounting points are preferably a plurality of screw holes equally distributed about the housing 900 circumference, but may alternately be a groove 620 running along the housing 900 circumference, grooves 620 running along a chord of the housing 900, mounting tabs protruding from the housing 900 surface, or any other suitable means of securing the housing 900 to the mounting mechanism 700. The positioning mechanism 400 is preferably rotatably coupled to the housing, such that the positioning mechanism 400 rotates relative to the housing. The positioning mechanism 400 is preferably rotatably coupled to the housing by a shaft, but may alternately be coupled using any other suitable mechanism or be uncoupled from the housing. The rotating ring 200 is preferably statically coupled to the housing 900, such that the rotating ring 200 rotates as the housing 900 rotates. The rotating ring 200 is preferably a portion of the housing 900. More preferably, the rotating ring 200 is a protrusion jutting out from the interior flat face of the housing 900. However, the rotating ring 200 may be coupled to the housing 900 such that the rotating ring 200 rotates with the housing but also translates in a circular manner about the positioning mechanism 400. The rotating ring 200 may be mechanically coupled to the interior wall of the housing 900 (e.g. via screw, glue, Velcro), may be magnetically coupled to the housing 900, or may not be coupled to the housing 900 at all, and instead be directly coupled to the wheel. Other components, such as the groove 620 that forms the pump cavity 610 or the wall that constrains the occluding ring 800 may additionally be integrally formed with the housing 900.

2. Exemplary Embodiments of the Tire Inflation System

Figure 12A:
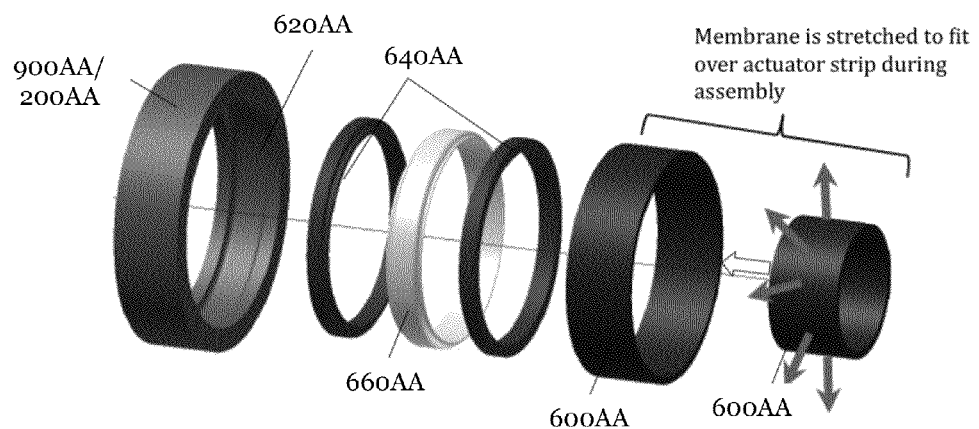
FIGS. 12A and 12B are an exploded view and a perspective view of a first embodiment of the tire inflation system, respectively, the system including diaphragm 600AA, actuator strip 660AA, diaphragm restraint 640AA, groove 620AA, housing 900AA, and rotating ring 200AA.
Figure 12B:
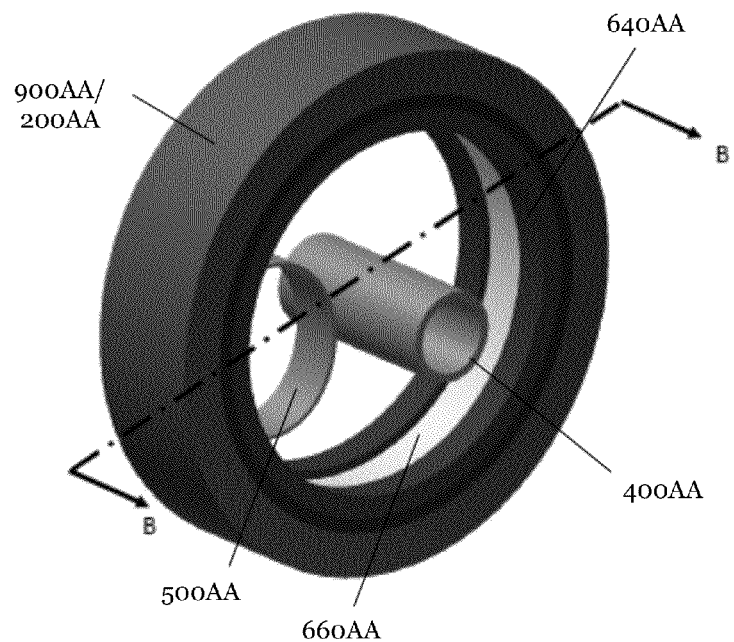

In a first exemplary embodiment, as shown in FIGS. 12A and 12B, the tire inflation system 100 includes a positioning mechanism 400 that is a cylinder held concentrically within the rotating ring 200, wherein the positioning mechanism 400 is rotatably fixed to the housing with a shaft, and the rotating ring 200 is integrally formed with the housing, encircling the positioning mechanism 400. A lever arm with a first segment and a second segment at substantially right angles with the first, extending from the flat surface of the positioning mechanism 400 along the rotational axis, rigidly couples the eccentric mass 300 to the positioning mechanism 400. The pump cavity 610 is disposed on the inner bearing surface of the rotating ring 200, wherein the bearing surface includes a curved, flattened bell-shaped groove 620 running along an arc of the bearing surface. The pump cavity 610 is formed by a diaphragm 600 placed over the groove 620, but may alternately be defined by a diaphragm 600, placed within the groove 620, that defines a tubular pump cavity 610 with an amygdaloidal cross section. The pump cavity 610 includes an inlet fluidly coupled to the environment, and an outlet fluidly coupled to the tire. The diaphragm 600 is held against the rotating ring 200 by a diaphragm restraint 640 comprising two rings that couple to the inner bearing surface of the rotating ring 200, wherein the diaphragm restraint 640 forms a portion of the bearing surface of the rotating ring 200. The diaphragm 600 comprises a ring of flexible membrane that is stretched over the diaphragm restraint 640, then coupled to the rotating ring 200 by coupling the diaphragm restraint 640 to the rotating ring 200. The diaphragm 600 additionally includes an actuator strip 660, wherein the cross section of the occluding component of the actuator strip 660 has a geometry that substantially compliments both the groove 620 and the edges of the groove 620. The actuator strip 660 is retained along the longitudinal edges of the strip by the diaphragm restraint 640. This embodiment preferably includes one roller element 500 in non-slip contact with the bearing surface (radial surface) of the positioning mechanism 400 and the inner bearing surface of the rotating ring 200. However, more roller elements 500 may be used. The roller element 500 is preferably a cylinder, and has substantially the same diameter as the width of the annular channel between the positioning mechanism 400 and the rotating ring 200. As the wheel rotates, the rotating ring 200 rotates with the housing while the positioning mechanism 400 retains its angular position due to the eccentric mass 300 hanging from the lever arm. The relative motion between the rotating ring 200 and the positioning mechanism 400 causes the roller element 500 to revolve about the positioning mechanism 400, rolling along the inner bearing surface of the rotating ring 200. The roller element 500 applies a substantially normal occluding force to successive portions of the actuator strip 660, which transfers the force to deform the diaphragm 600 and occlude the pump cavity 610. In doing so, the roller element 500 pushes packets of fluid before the occlusion, pumping fluid (preferably air) from the ambient environment to the tire. Utilization of a pre-stretched diaphragm 600 facilitates increased fluid intake into the pump cavity 610, as release of the occlusion creates suction inside the pump cavity 610.

In a second exemplary embodiment, as shown in FIGS. 13A and 13B, the tire inflation system 100 includes a rotating ring 200, a positioning mechanism 400 that is a gravity ring 420 concentric with the rotating ring 200, an eccentric mass 300 incorporated into a portion of the gravity ring 420, and a housing 900, that uses a mounting mechanism 700 to couple to the rotational surface 50. In this embodiment, the gravity ring diameter is larger than that of the rotating ring. Alternatively, the rotating ring 200 projects out of the interior flat face of the housing 900, the gravity ring 420 diameter is smaller than that of the rotating ring 200, and the eccentric mass 300 is incorporated into the gravity ring 420 such that both radial surfaces of the gravity ring 420 are substantially smooth. The tire inflation system 100 further includes eight roller elements 500 located in between the gravity ring 420 and the rotating ring 200, wherein the roller elements 500 are equally spaced about the circumference of the gravity ring 420 and the spacing maintained with a retainer ring 700. The tire inflation system 100 can be assembled such that the rotating ring 200 encircles the gravity ring 420, wherein the gravity ring 420 and rotating ring 200 are concentric. Alternatively, the tire inflation system 100 can be assembled such that the gravity ring 420 encircles the rotating ring 200. The retaining ring is between, and concentric with, the rotating ring 200 and the gravity ring 420; and the roller elements 500 span the gap between the gravity ring 420 and the rotating ring 200 and are oriented such that they roll when the rotating ring 200 rolls. To use the tire inflation system 100, the housing 900 is sealed and the tire inflation system 100 is mounted to a wheel, preferably a truck wheel, by using the mounting mechanism 700. When the wheel rotates, the housing 900 and associated retainer ring 700 rotate with the wheel, but the eccentric mass 300 prevents the gravity ring 420 from rotating, causing the roller elements 500 to roll along the bearing surfaces of the gravity ring 420 and rotating ring 200. If a peristaltic tube 60 is included along the bearing surface of the rotating ring 200, the rotation of the rotating ring 200 causes the peristaltic tube 60 to roll along the roller elements 500, wherein the roller elements 500 may occlude successive sections the peristaltic tube 60, effectively pumping packets of fluid contained between the occlusions in the peristaltic tube 60 in the direction opposite that of wheel rotation.

In a third exemplary embodiment, as shown in FIGS. 14A and 14B, the tire inflation system 100 includes a cylindrical positioning system 320 rotatably coupled to the housing center; a rotating ring 200, movable relative to the housing, with a hemispherical face surface 280; a roller element 500 in non-slip contact with the positioning mechanism 400 and rotating ring 200, the roller element 500 having a substantially large diameter (i.e. larger than the annular width between the positioning mechanism 400 and the rotating ring 200); an occluding ring 800 in sliding contact with the hemispherical face surface 280 of the rotating ring 200, wherein motion of the occluding ring 800 is substantially restricted in a plane parallel to the plane of rotation of the roller element 500; and a diaphragm 600 defining a pump cavity 610, disposed on the occluding ring 800 end opposing the rotating ring 200 that is either formed from a groove 620 and a diaphragm 600 sheet or from a diaphragm 600 formed in a tube. The eccentric mass 300 of the positioning system 320 is preferably coupled to the positioning mechanism 400 in the same manner as the first exemplary embodiment. The diameter of the roller element 500 causes the positioning mechanism 400 to be eccentric with the rotating ring 200 rotational axis, resulting in the rotating ring 200 taking a peritrochiod path of travel about the positioning mechanism 400 as the roller element 500 rotates about the positioning mechanism 400. As the rotating ring 200 rotates about the positioning mechanism 400, the curvature of the hemispherical face surface 280 causes successive sections of the occluding ring 800 to rotate in and out of a plane substantially parallel to the plane of rotating ring 200 rotation, such that the occluding ring 800 moves in a three-dimensional, wobbling motion. This occurs because the occluding ring 800 is substantially restricted from movement within the plane by walls encircling the occluding ring 800. As the occluding ring 800 rotates out of the plane, the occluding ring 800 deforms the diaphragm 600 and occludes the pump cavity 610.

In a fourth exemplary embodiment, as shown in FIGS. 15A-15C, the tire inflation system 100 includes a cylindrical positioning system 320 rotatably coupled to the housing center; a rotating ring 200, movable relative to the housing, with a curved face surface 280; a roller element 500 in non-slip contact with the positioning mechanism 400 and rotating ring 200, the roller element 500 having a substantially large diameter (i.e. larger than the annular width between the positioning mechanism 400 and the rotating ring 200); an occluding ring 800 in sliding contact with the curved face surface 280 of the rotating ring 200, located substantially near the nadir of the face surface 280, wherein motion of the occluding ring 800 is substantially restricted in a plane parallel to the plane of rotation of the roller element 500; and a first and a second diaphragm 600 defining a first and a second pump cavity 610, disposed on the occluding ring 800 end opposite the first and second nadir of the rotating ring 200 face surface 280, respectively, wherein the first and second pump cavities are fluidly coupled by a tube. The eccentric mass 300 of the positioning system 320 is preferably coupled to the positioning mechanism 400 in the same manner as the first embodiment. The diameter of the roller element 500 causes the positioning mechanism 400 to always be eccentric with the rotating ring 200 rotational axis, resulting in the rotating ring 200 taking a peritrochiod path of travel about the positioning mechanism 400 as the roller element 500 rotates about the positioning mechanism 400. The rotating ring 200 is preferably constrained in one dimension (e.g. the horizontal direction), preferably in the direction normal to the curvature, and preferably has an ovular bearing surface, wherein the major axis is aligned with the restricted direction. This configuration allows the rotating ring 200 to move in a substantially linear path when the roller element 500 rotates about the positioning mechanism 400, as opposed to a substantially circular path (of the third exemplary embodiment). As the rotating ring 200 translates about the positioning mechanism 400, the curvature of the curved face surface 280 causes the occluding ring 800 to rotate in and out of a plane substantially parallel to the plane of rotating ring 200 translation, such that the occluding ring 800 moves in a substantially two dimensional, in-out path (i.e. away from the wheel 50 and towards the wheel 50). This occurs because the occluding ring 800 is substantially restricted from movement within the plane by walls encircling the occluding ring 800. As the occluding ring 800 rotates out of the plane, the occluding ring 800 deforms the diaphragm 600 and decreases the volume of a pump cavity 610, pressurizing the pump cavity 610. As the roller element 500 rotates about the positioning mechanism 400, the occluding ring 800 pumps the first and second pump cavities in succession. The first pump cavity 610 may additionally include one or more inlet valves 612a fluidly coupled to the environment, the second pump cavity 610 may additionally include one or more outlet valves 612b fluidly coupled to the tire interior, and the connecting pump may additionally include one or more check valves, such that occlusion of the first pump cavity 610 forces ingressed fluid into the second pump cavity 610, and occlusion of the second pump cavity 610 forces the fluid into the tire while allowing fluid flow into the first pump cavity 610 from the environment (e.g. by creating a suction).

As a person skilled in the art will recognize from the previous detailed description and from the figures and claims, modifications and changes can be made to the preferred embodiments of the invention without departing from the scope of this invention defined in the following claims.

I claim:

1. A tire inflation system that couples to a wheel of a vehicle, the tire inflation system comprising:
    a pumping ring that rotates with the wheel;
    a positioning system with a center of rotation, rotatably coupled to the wheel, the pumping ring and positioning system defining an annular channel therebetween, the positioning system comprising:
        a positioning mechanism with a first bearing surface, wherein the center of rotation of the positioning system is the center of rotation of the positioning mechanism; and,
        an eccentric mass, coupled to the positioning mechanism, that offsets the center of mass of the positioning system from the center of rotation of the positioning system;
    a planetary roller disposed within the annular channel in non-slip contact with the first bearing surface and a second bearing surface, the second bearing surface being a radial surface of the pumping ring proximal the positioning mechanism;
    a flexible diaphragm disposed along a radial surface of the pumping ring and defining a pump cavity, wherein successive sections of the pump cavity are occluded by deformation of the diaphragm by the pumping ring.

2. The system of claim 1, wherein the eccentric mass is coupled to the positioning mechanism by a lever arm.

3. The system of claim 1, wherein the eccentric mass is coupled eccentrically to the positioning mechanism.

4. The system of claim 1, wherein the radial surface of the positioning mechanism has substantially constant curvature.

5. The system of claim 1, wherein the pumping ring is statically coupled to the wheel.

6. The system of claim 1, wherein the pumping ring encircles the positioning mechanism.

7. The system of claim 6, wherein the positioning mechanism rotational axis is fixed coaxially relative to the wheel.

8. The system of claim 7, wherein the positioning mechanism is rigid.

9. The system of claim 8, wherein the pumping ring is substantially concentric with the positioning mechanism.

10. The system of claim 9, further including a housing statically coupled to the pumping ring and rotatably coupled to the positioning mechanism, wherein the housing maintains the pumping ring in concentric position with the positioning mechanism.

11. The system of claim 10, wherein the positioning mechanism is a cylinder.

12. The system of claim 7, wherein the planetary roller is flexible.

13. The system of claim 1, wherein the diaphragm is a flexible tube with an amygdaloidal cross section, wherein the tube interior defines the pump cavity.

14. The system of claim 1, wherein the tire inflation system further includes a groove.

15. The system of claim 14, wherein the diaphragm is a flexible membrane disposed over the groove, such that the pump cavity is defined between the groove and the diaphragm.

16. The system of claim 15, wherein the diaphragm is under tension.

17. The system of claim 15, wherein the groove is a radial groove and is integral with the second bearing surface.

18. The system of claim 17, wherein the planetary roller applies an occluding force to the diaphragm, deforming the diaphragm and occluding a section of the pump cavity.

19. The system of claim 18, wherein the diaphragm is disposed between the planetary roller and the pumping ring, such that the pump cavity is occluded by the interaction between the planetary roller and pumping ring.

20. The system of claim 19, wherein the tire inflation system further includes an actuation strip disposed between the planetary roller and the diaphragm, wherein the actuation strip distributes the occluding force over a diaphragm section.

21. The system of claim 20, wherein the portion of the actuation strip contacting the diaphragm has an actuating profile that substantially compliments the groove profile.

22. The system of claim 21, wherein the actuating profile substantially compliments the opening and bounding edges of the groove profile.

23. The system of claim 1, further including a spacer roller disposed within the annular cavity in non-slip contact with the positioning mechanism and the pumping ring, wherein the spacer roller constrains the positioning mechanism against the planetary roller.

24. The system of claim 23, wherein the spacer roller is flexible.

25. A tire inflation system, couplable to a wheel of a vehicle, wherein the wheel rotates to roll along a road surface, the tire inflation system comprising:
- a cylindrical positioning mechanism rotatably coupled to the wheel, the positioning mechanism having a first bearing surface;
- an eccentric mass, coupled by a lever arm to the longitudinal axis of the positioning mechanism, wherein the eccentric mass maintains a constant angular position of the positioning mechanism relative to the road surface during wheel rotation;
- a pumping ring that rotates with the wheel, wherein the pumping ring is concentric about the positioning mechanism;
- a planetary roller in non-slip contact with the first bearing surface and a second bearing surface, wherein the second bearing surface is an inner radial surface of the pumping ring;
- a flexible diaphragm disposed along the second bearing surface and defining a pump cavity, wherein the planetary roller applies an occluding force against the diaphragm, wherein the occluding force deforms the diaphragm against the pumping ring and occludes the pump cavity;
- an actuator strip, disposed between the flexible diaphragm and the planetary roller, that distributes the occluding force over a section of the diaphragm, wherein the portion of the actuator strip contacting the diaphragm substantially compliments a pump cavity groove profile.

* * * * *